United States Patent [19]
Manners et al.

[11] Patent Number: 5,945,058
[45] Date of Patent: Aug. 31, 1999

[54] METHOD AND APPARATUS FOR IDENTIFYING SURFACE FEATURES ASSOCIATED WITH SELECTED LAMINA OF A THREE-DIMENSIONAL OBJECT BEING STEREOLITHOGRAPHICALLY FORMED

[75] Inventors: Chris R. Manners, Moorpark; Dennis R. Smalley, Newhall, both of Calif.

[73] Assignee: 3D Systems, Inc., Valencia, Calif.

[21] Appl. No.: 08/854,950

[22] Filed: May 13, 1997

[51] Int. Cl.$^6$ ............... B29C 35/08; B29C 41/02; B29C 41/52
[52] U.S. Cl. ............. 264/401; 264/40.1; 264/308; 364/130; 364/468.27; 425/135; 425/174.4
[58] Field of Search ................... 264/40.1, 308, 264/401; 425/135, 174.4; 364/468.27, 130

[56] References Cited

U.S. PATENT DOCUMENTS

| | | | |
|---|---|---|---|
| 5,096,530 | 3/1992 | Cohen | 264/401 X |
| 5,182,715 | 1/1993 | Vorgitch . | |
| 5,258,146 | 11/1993 | Almquist et al. | 264/401 |
| 5,597,520 | 1/1997 | Smalley . | |

FOREIGN PATENT DOCUMENTS

WO 95/29053  11/1995  WIPO .

OTHER PUBLICATIONS

Copy of International Search Report for International Application No. PCT/US98/09666.

*Primary Examiner*—Leo B. Tentoni
*Attorney, Agent, or Firm*—Dennis R. Smalley; Forrest L. Collins

[57] ABSTRACT

This invention relates to the stepwise layer-by-layer formation of a three-dimensional object through application of the principles of stereolithography and to the automatic detection of surface features of each layer of a three-dimensional object to manufacture parts more reliably, more accurately and more quickly. Automatic detection of trapped volume regions and size of solidified cross-sectional regions are disclosed. Automatic selection of recoating styles is made based on (1) the detected regions, (2) empirically or otherwise determined optimum recoating styles for different types of regions, and (3) a look-up table, other correlation system, or processor for associating recoating style information with laminae containing particular identified regions.

34 Claims, 26 Drawing Sheets

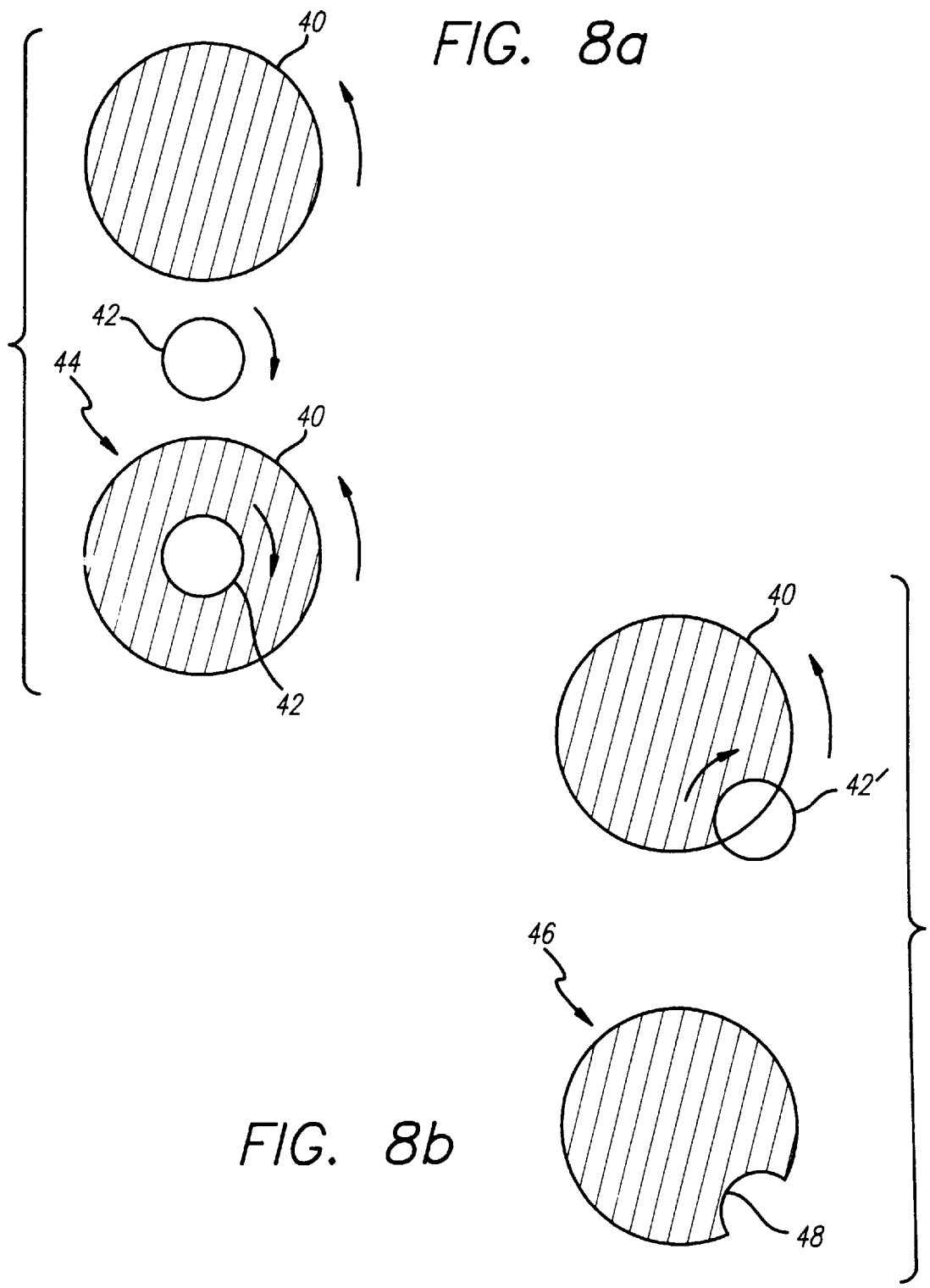

ICSB

CS3

DB

CS3

UB

CS3

CB

CS3

ICSB

CS4

DB

CS4

UB

CS4

CB

CS4

ICSB

CS5
DB

CS5
UB

CS5
CB

CS5
ICSB

FIG. 17a

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

— 170

$N=1 \quad (ITV_N) = \emptyset$

FIG. 17b

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

— 170

$(ITV_N + IUB_{N-1}) = PTV_N = \emptyset$

FIG. 17c

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 1 | 1 | 0 | 0 | 0 | 0 | 0 | 0 | 0 | 0 | 0 | 0 | 0 |
| 0 | 0 | 1 | 1 | 1 | 0 | 0 | 0 | 0 | 0 | 0 | 0 | 0 | 0 | 0 | 0 |
| 0 | 0 | 1 | 1 | 1 | 0 | 0 | 0 | 0 | 0 | 0 | 0 | 0 | 0 | 0 | 0 |
| 0 | 0 | 1 | 1 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

— 180

$(ICSBH_N)$

FIG. 17d

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

— 180

$(TV_N) = \emptyset$

FIG. 18a

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

$N=2 \quad (ITV_N) = \emptyset$

FIG. 18b

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

$(ITV_N + IUB_{N-1}) = PTV_N = \emptyset$

FIG. 18c

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 1 | 1 | 1 | 0 | 0 | 0 | 0 | 0 | 0 | 0 | 0 | 0 | 0 |
| 0 | 0 | 1 | 1 | 1 | 1 | 0 | 0 | 0 | 0 | 0 | 0 | 0 | 0 | 0 | 0 |
| 0 | 0 | 1 | 1 | 1 | 1 | 0 | 0 | 0 | 0 | 0 | 0 | 0 | 0 | 0 | 0 |
| 0 | 0 | 1 | 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

$(ICSBH_N)$

FIG. 18d

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

$(TV_N) = \emptyset$

FIG. 19a

| 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |

$N=3 \quad (ITV_N) = \emptyset$

FIG. 19b

| 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 0 | 0 | 0 | 0 | 0 | 0 | 0 |

$(ITV_N + IUB_{N-1}) = PTV_N$

FIG. 19c

| 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| 0 | 0 | 1 | 1 | 1 | 0 | 0 | 0 | 0 | 0 | 1 | 1 | 1 | 1 | 0 | 0 | 0 |
| 0 | 0 | 1 | 1 | 1 | 0 | 0 | 0 | 0 | 0 | 1 | 1 | 1 | 1 | 0 | 0 | 0 |
| 0 | 0 | 1 | 1 | 1 | 0 | 0 | 0 | 0 | 0 | 1 | 1 | 1 | 1 | 0 | 0 | 0 |
| 0 | 0 | 1 | 1 | 1 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 0 | 0 | 0 | 0 | 0 | 0 | 0 |

$(ICSBH_N)$

FIG. 19d

| 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 1 | 1 | 1 | 1 | 0 | 0 | 0 |
| 0 | 0 | 0 | 0 | 0 | 0 | 0 | 0 | 0 | 0 | 0 | 0 | 0 | 0 | 0 | 0 | 0 |

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 | 1 | 0 | 0 |
| 0 | 0 | 0 | 0 | 0 | 0 | 0 | 0 | 0 | 0 | 1 | 1 | 1 | 1 | 0 | 0 |
| 0 | 0 | 0 | 0 | 0 | 0 | 0 | 0 | 0 | 0 | 1 | 1 | 1 | 1 | 0 | 0 |
| 0 | 0 | 0 | 0 | 0 | 0 | 0 | 0 | 0 | 0 | 1 | 1 | 1 | 1 | 0 | 0 |
| 0 | 0 | 0 | 0 | 0 | 0 | 0 | 0 | 0 | 0 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |

$N=4$  $(ITV_N)$

FIG. 20b

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |

$(ITV_N + IUB_{N-1}) = PTV_N$

FIG. 20c

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 1 | 1 | 1 | 0 | 0 | 1 | 1 | 0 | 1 | 1 | 1 | 1 | 0 | 0 |
| 0 | 0 | 1 | 1 | 1 | 0 | 0 | 1 | 1 | 0 | 1 | 1 | 1 | 1 | 0 | 0 |
| 0 | 0 | 1 | 1 | 1 | 0 | 0 | 1 | 1 | 0 | 1 | 1 | 1 | 1 | 0 | 0 |
| 0 | 0 | 1 | 1 | 1 | 0 | 0 | 1 | 1 | 0 | 1 | 1 | 1 | 1 | 0 | 0 |
| 0 | 0 | 1 | 1 | 1 | 0 | 0 | 1 | 1 | 0 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |

$(ICSBH_N)$

FIG. 20d

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 1 | 1 | 0 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |

N=5   ($ITV_N$)

FIG. 21b

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 1 | 1 | 1 | 0 | 1 | 1 | 1 | 1 | 1 | 1 |
| 0 | 0 | 0 | 0 | 0 | 0 | 1 | 1 | 1 | 0 | 1 | 1 | 1 | 1 | 1 | 1 |
| 0 | 0 | 0 | 0 | 0 | 0 | 1 | 1 | 1 | 0 | 1 | 1 | 1 | 1 | 1 | 1 |
| 0 | 0 | 0 | 0 | 0 | 0 | 1 | 1 | 1 | 0 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 |

$(ITV_N + IUB_{N-1}) = PTV_N$

FIG. 21c

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 1 | 1 | 0 | 1 | 1 | 1 | 0 | 0 | 0 | 0 | 0 | 0 | 0 |
| 0 | 0 | 1 | 1 | 1 | 0 | 1 | 1 | 1 | 0 | 0 | 0 | 0 | 0 | 0 | 0 |
| 0 | 0 | 1 | 1 | 1 | 0 | 1 | 1 | 1 | 0 | 0 | 0 | 0 | 0 | 0 | 0 |
| 0 | 0 | 1 | 1 | 1 | 0 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

($ICSBH_N$)

FIG. 21d

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

N=6  ($ITV_N$)

FIG. 22b

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 1 | 1 | 1 | 1 | 0 | 0 | 0 | 0 | 0 | 0 | 0 |
| 0 | 0 | 0 | 0 | 0 | 1 | 1 | 1 | 1 | 0 | 0 | 0 | 0 | 0 | 0 | 0 |
| 0 | 0 | 0 | 0 | 0 | 1 | 1 | 1 | 1 | 0 | 0 | 0 | 0 | 0 | 0 | 0 |
| 0 | 0 | 0 | 0 | 0 | 1 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

($ITV_N + IUB_{N-1}$) = $PTV_N$ — 184

FIG. 22c

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 1 | 1 | 1 | 1 | 1 | 1 | 0 | 0 | 0 | 0 | 0 | 0 | 0 |
| 0 | 0 | 1 | 1 | 1 | 1 | 1 | 1 | 1 | 0 | 0 | 0 | 0 | 0 | 0 | 0 |
| 0 | 0 | 1 | 1 | 1 | 1 | 1 | 1 | 1 | 0 | 0 | 0 | 0 | 0 | 0 | 0 |
| 0 | 0 | 1 | 1 | 1 | 1 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

($ICSBH_N$) — 186

FIG. 22d

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1+ | 1+ | 1+ | 1 | 1 | 1 | 1 | 0 | 0 | 0 | 0 | 0 | 0 | 0 |
| 0 | 0 | 1+ | 1+ | 1+ | 1 | 1 | 1 | 1 | 0 | 0 | 0 | 0 | 0 | 0 | 0 |
| 0 | 0 | 1+ | 1+ | 1+ | 1 | 1 | 1 | 1 | 0 | 0 | 0 | 0 | 0 | 0 | 0 |
| 0 | 0 | 1+ | 1+ | 1+ | 1 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

($TV_N$)

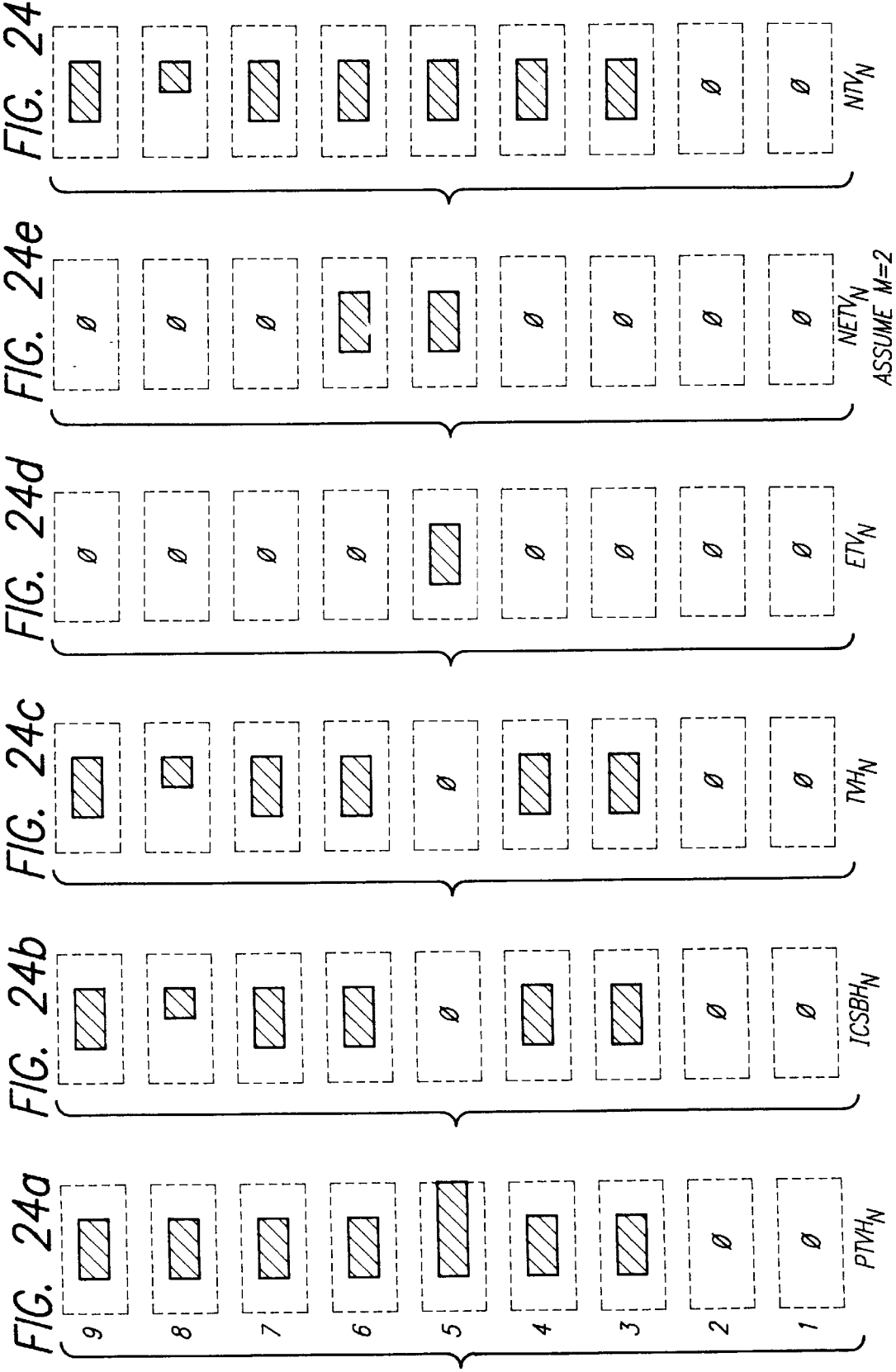

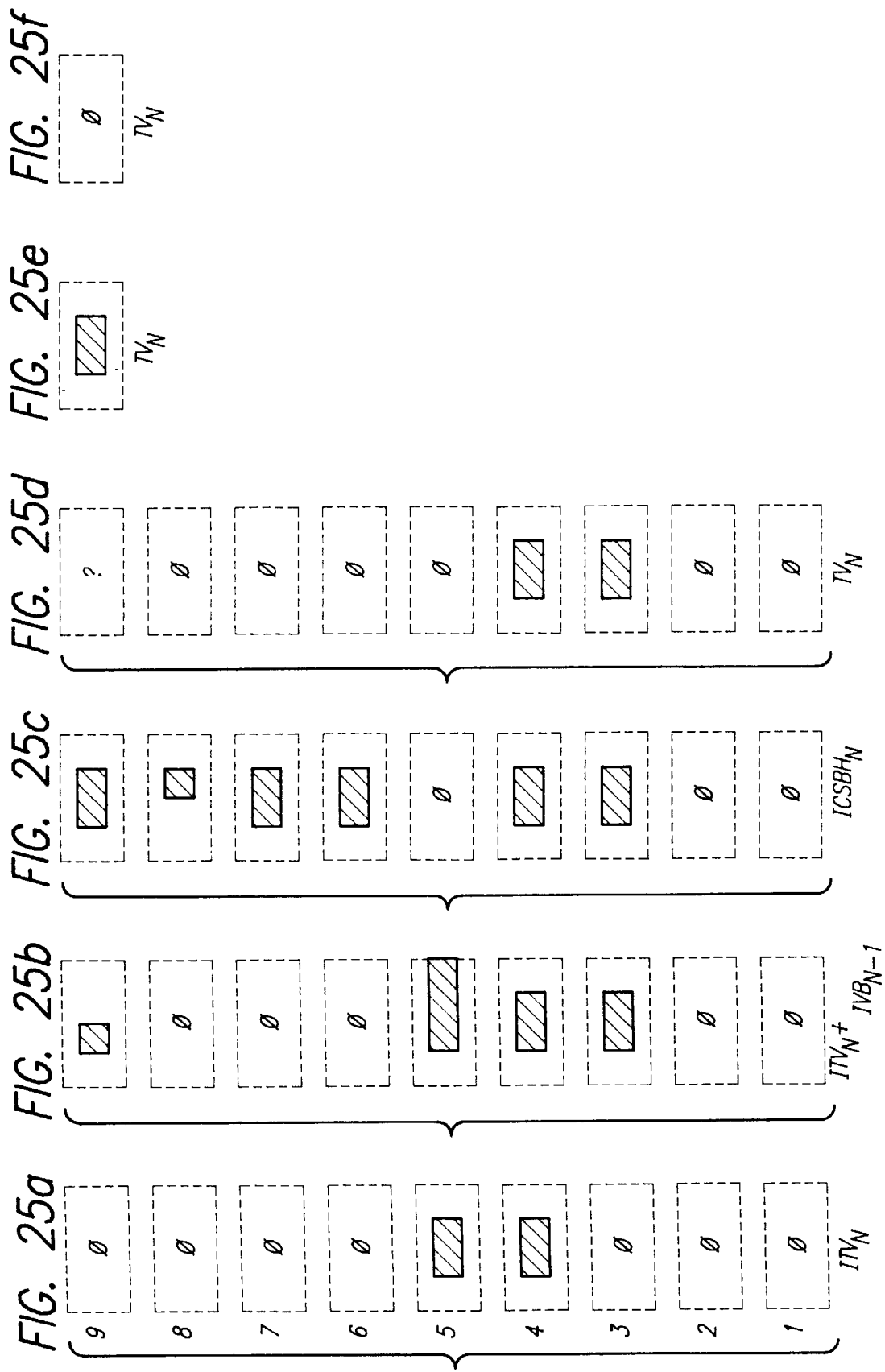

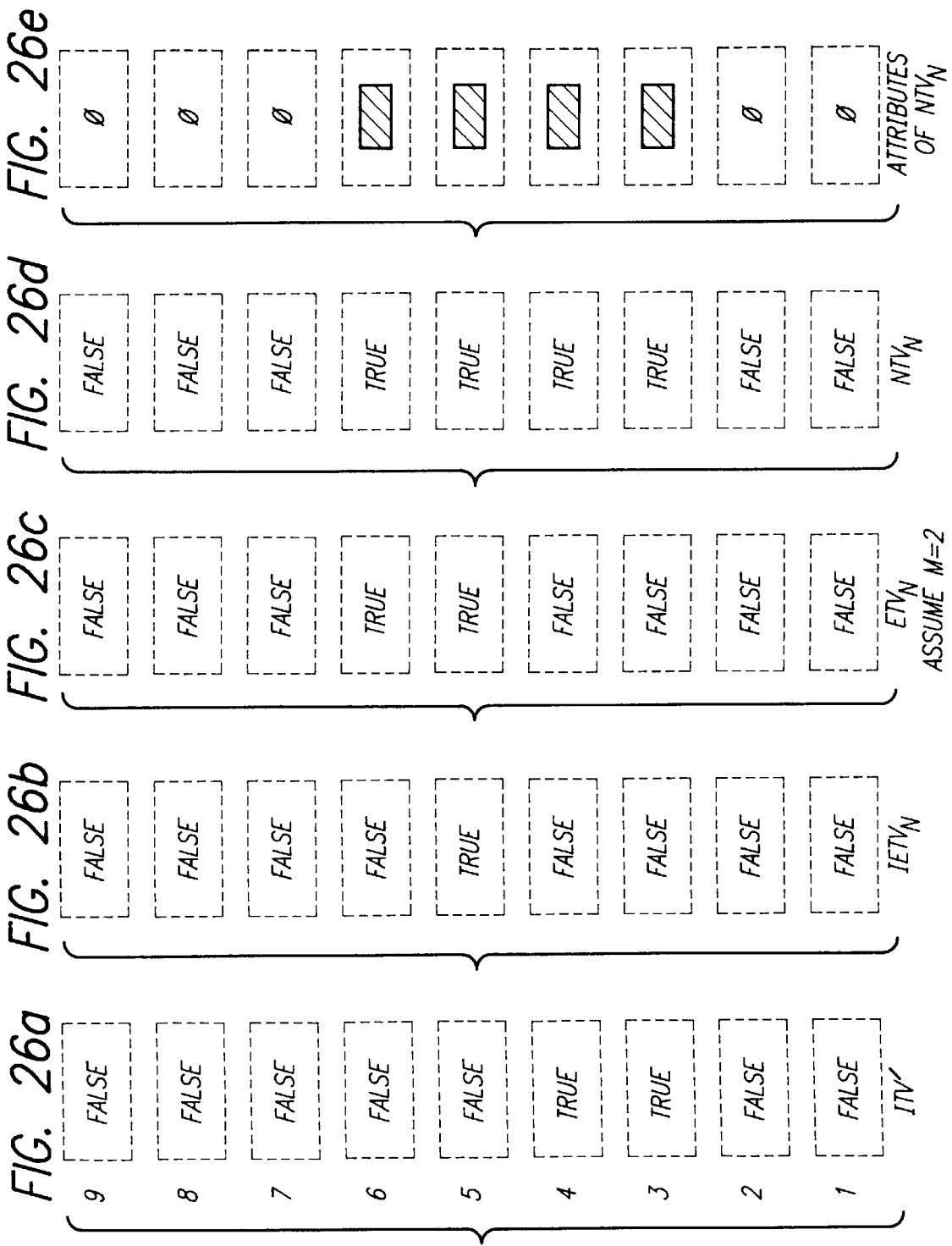

METHOD AND APPARATUS FOR IDENTIFYING SURFACE FEATURES ASSOCIATED WITH SELECTED LAMINA OF A THREE-DIMENSIONAL OBJECT BEING STEREOLITHOGRAPHICALLY FORMED

BACKGROUND OF THE INVENTION

1. Field of the Invention

This invention relates generally to the lamina-by-lamina formation of three-dimensional objects through application of the principles of stereolithography, and more specifically, to the automatic detection of surface features of selected laminae of the three-dimensional objects.

2. Description of Related Art

Several building techniques exist for building three-dimensional objects in layers (e.g. laminae). One such technique is stereolithography, which is described in U.S. Pat. No. 4,575,330 (hereinafter referred to as the '330 patent). According to the principles of stereolithography, a three-dimensional object is formed layer-by-layer in a step-wise fashion out of a material capable of physical transformation upon exposure to synergistic stimulation (e.g., fluid or fluid-like material such as a photopolymer, sinterable powder, or bindable powder). In one embodiment of stereolithography, as shown in FIG. 1, layers of liquid photopolymer are successively formed and selectively transformed into solidified laminae which are adhered to adjacent previously formed laminae at the working surface of a volume of the liquid photopolymer.

In building a three-dimensional object and more particularly in the step of forming layers of flowable material (e.g. liquid photopolymer material) adjacent to any previously formed lamina, the goal is to form coatings of desired thickness (e.g. uniform thickness of 2–10 mils) such that the unsolidified material has a desired surface shape (e.g. planar surface) in preparation for forming a next lamina (i.e. layer of the object) from data which is descriptive of the three-dimensional object and which is correlated to the desired thickness and surface shape (e.g. planar data representing a particular cross-section of the object having a desired thickness). Since it is typical to work with planar layers, it is important that the surface level of building material in the working area (i.e. the area that can or will be exposed to the prescribed stimulation) be at the same level. If during formation, the configuration or geometry of the desired object results in regions of unsolidified material that are isolated from or poorly connected to other regions of unsolidified material, there may be a difficulty in causing those effectively isolated regions to attain the same surface level in a time period thought to be reasonable or optimal for the recoating process. This has been found to be particularly problematic when an isolated region results from wall-like structures which have upper surfaces close to the desired surface level of the unsolidified material (e.g. 1 layer thickness—2 to 10 mils) and a floor-like structure which is further under the desired surface level. These particularly problematic regions have come to be known as trapped volumes. It is further known that trapped volumes can effectively exist even though complete isolation does not exist. For example effective trapped volumes can exist even though gaps, holes or breaches may exist in the side walls or floor of the solidified material which bounds the region of unsolidified material. In other words, an effective trapped volume can exist whenever two bodies (i.e. regions) of unsolidified material are separated by a restricted flow path that limits sufficient flow from one region to the other such that a uniform surface level between the two regions is not naturally reached within a desired amount of time.

Problems associated with trapped volume regions are discussed in U.S. Pat. No. 5,258,146. Trapped volumes can lead to difficulties in using a doctor blade and other recoating devices. Typically, in the process of forming a coating over a just formed lamina, it is desirable to form a coating of excess thickness over the lamina which can be swept down to the right thickness by a smoothing device (e.g. a flexible or rigid doctor blade, a flexible or rigid rake, a brush, etc.). In fact the height of the excess material in front of a doctor blade typically grows as the blade is swept across the last solidified layer as more and more material is removed from the region just swept by the blade. The existence of a large bulge of material in front of the blade can be problematic when sweeping over a trapped volume. When a large bulge of material is in front of a smoothing device and a trapped volume is encountered, material in the bulge may flow backwards underneath the blade and thereby disrupt the desired layer thickness of the smooth layer which was hoped to be formed in the wake of the blade. A height differential in front of and behind the blade creates a pressure difference between the front and the back of the blade. This situation can cause a driving force which can cause the resin to flow dependent on the viscosity of the resin and the size of the flow paths available to the resin. In a trapped volume situation, the most open flow path may be for the resin to flow under and behind the doctor blade as opposed to flowing ahead of the blade. As a result, a substantial bulge may remain within the trapped volume region as opposed to being swept ahead of the blade and out of the trapped volume region. Therefore, when the doctor blade finishes the sweeping over the trapped volume region, the amount of resin removed from the trapped volume may be far less than desired.

This problem is illustrated with FIG. 2a which shows recoating device (e.g. blade) 20 in the middle of a sweep from left to right as indicated by arrow 26. Prior to beginning the sweep from left to right, part (i.e. object) 24 has been over coated with unsolidified material having an excess thickness. During the sweeping step, the separation of the blade and the desired working surface is known as the blade gap, while the separation of the blade from the upper surface of the last solidified layer is known as the blade clearance. For simplicity in this example, the blade gap is assumed to be zero and the blade clearance is assumed to be one layer thickness. In FIG. 2a the blade clearance is indicated to be a distance 23. As indicated by reference numeral 21, the resin surface in the wake of the blade is shown as being smoothed and trimmed to the desired level, while a bulge of excess resin, identified by reference numeral 22, is formed in front of the blade. In fact as the blade sweeps, the bulge in front of the blade gets larger since the material removed from the regions that are now behind the blade is added to those regions remaining in front of the blade. To attain its goal, blade 20 must sweep the excess material away from the object; however, this goal may be thwarted when the blade encounters a trapped volume of resin 25. Although the pressure differential between the material above the desired surface level (i.e. the material in bulge 22) and remaining material, will cause material in the bulge to flow to other regions, the rate of material transfer depends on a number of factors including the size of the flow paths available. As can be seen, flow path 27, within trapped volume 25, is much larger than flow path 28 over the right-hand wall 27. As such, material in bulge 22 is much more likely to flow to the region behind the blade than to flow through path 28. This disrupts the formation of smooth surface 21. In other words, this back flow of material results in insufficient material being removed from the trapped volume region, thereby causing the actual surface level to be too high within the trapped volume and too low outside the trapped volume. This effect is less pronounced where the blade is traveling over a flat, horizontal surface of a part, since the flow path in front of the blade is larger than the flow path underneath the blade 20.

Automatic vent or drain generation, as discussed in International Publication No. WO 95/29053, helps eliminate trapped volume problems, but does so by inserting holes into what should have been solid regions of the object. After object formation these holes must be filled to achieve object integrity. A solution which does not exchange one problem (trapped volume recoating issues) for another problem (unwanted holes in the object) is desired.

In a stereolithography apparatus ("SLA") using an applicator blade, a different type of problem exists. The applicator blade may use an opposite approach to recoat than that of the doctor blade. In a stereolithography apparatus using this technique and shown in FIG. 2b, after the last formed object cross section 30 has been formed by selectively exposing the building material to synergistic stimulation, the object 31 is dipped into the building material to a depth of approximately one layer thickness, or other desired thickness, below the desired working surface 32 of the building material 33. During the exposure process, applicator 34 is at least partially filled with material 33 and after the exposure process, applicator 34 is swept at or slightly above the desired working surface 32 while dispensing material from opening 36 to form an adjacent building material layer 37.

Because there is typically no process to form an initial coating of excess thickness (e.g. deep dipping where the object is dipped into the building material by more than one layer thickness) in a typical layer formation process using the applicator blade (i.e. a material dispensing device), not only must the applicator supply resin over the regions solidified in association with the formation of the last lamina but it must also add resin into the trapped volume as it moves across that region. If the applicator blade fails to provide exactly the right amount of resin into the trapped volume region, any excess liquid may not flow from the trapped volume region quickly enough or any shortage of resin might not be filled in quickly enough due to the flow restrictions inherent therein. Though, these problems may be minor when considering the formation of a single layer, they can be problematic, if not catastrophic, to part building when a plurality of adjacent layers continue the formation of a trapped volume, whereby these errors can be accumulated. Consequently, trapped volume regions are problematic to defining generalized optimized recoating styles when using either a doctor blade or an applicator blade.

Another parameter which can be varied to provide a uniform coating over a lamina is the speed of the blade. The speed may be varied between multiple sweeps over the same lamina or it may be varied between recoating processes over different laminae. It is even possible to vary the speed when recoating over different portions of a single lamina. When the blade is passing over a large, horizontal flat area of a part, if the blade is traveling too fast, too much resin may be swept away because of drag. In some instances drag may be so severe over flat areas, that substantially all liquid resin is swept away by the blade. Therefore, over large flat areas, it may be desirable to slow the blade speed so that the above problem does not occur.

On the other hand, over trapped volume regions, if the blade moves too slowly, this may give the resin in the bulge more time to flow underneath the blade. Therefore, over trapped volumes, it may be desirable to increase the speed of the blade so that resin does not have time to flow underneath.

In addition, object cross-sections which have narrow widths of solidified material can be efficiently coated over with different recoating styles (e.g. recoating techniques and/or recoating parameters) than are necessary with cross-sections having large solidified areas. Furthermore, not only is the structural configuration of the last solidified lamina critical to recoating, the structural configuration of laminae located within 0.5 to 2 mm or more below the target surface may also play a critical role in determining how to form coatings in optimal time, with optimal uniformity, and/or with desired thickness.

It has been found that a single set of recoating styles (i.e. recoating techniques and/or recoating parameters) cannot generally be optimally used to handle both trapped-volume regions and non-trapped-volume regions (such large solidified flat surface features). In fact, if a given layer contains both a trapped-volume region and a non-trapped-volume region (e.g. a large flat region), a different recoating style may be more optimal than that selected to optimize the process when either of these features exist alone. In existing stereolithography systems the selection and application of recoating styles can be done in two ways: 1) a single set of recoating parameters may be selected to form an object wherein the recoating parameters are not optimized for the most accurate and/or fastest formation of each layer thereby causing a reduction in through put of the system or loss of accuracy in the final object formed, or 2) recoating parameters can be manually selected on a range-by-range basis (i.e. a vertical level by vertical level basis) by the system operator based on his/her experience and understanding of the object to be formed, thereby resulting in more or less optimization in throughput and accuracy. The need for a more fully automated system for selecting recoating styles has been long felt in the art.

Due to the above phenomena, there is a long existing need in the stereolithography art for a more reliable, optimized, automated method and apparatus for forming layers of flowable building material in preparation for forming subsequent layers of an object being built. As a first step in producing such reliable, optimized, automated methods and apparatus it is important to accurately determine the presence of surface features of one or more previously formed object layers (e.g. large flat solidified regions and trapped volumes for each lamina.

All the U.S. patents and U.S. applications referred to herein are hereby incorporated by reference as if set forth in full herein.

ADDITIONAL RELATED PATENTS, APPLICATIONS, AND PUBLICATIONS

The patents and applications in the following table are hereby incorporated by reference herein as if set forth in full. The gist of each patent and application is included in the table to aid the reader in finding specific types of teachings. It is not intended that the incorporation of subject matter be limited to those topics specifically indicated, but instead the incorporation is to include all subject matter found in these applications, patents, and the applications giving rise to those patents. The teachings in these incorporated references can be combined with the teachings of the instant application in many ways. For example, the references directed to various data manipulation techniques may be combined with the teachings herein to derive even more useful modified object data that can be used to more accurately and/or efficiently form objects.

| Patent No. Application No. | Inventor | Subject |
| --- | --- | --- |
| 4,575,330 | Hull | Discloses fundamental elements of stereolithography. |
| 4,999,143 | Hull, et al. | Discloses various removable support structures applicable to stereolithography. |
| 5,058,988 | Spence | Discloses the application of beam profiling techniques useful in stereolithography for determining cure depth and scanning velocity, etc. |
| 5,059,021 | Spence, et al. | Discloses the utilization of drift correction techniques for eliminating errors in beam positioning resulting from instabilities in the beam scanning system |
| 5,076,974 | Modrek, et al. | Discloses techniques for post processing objects formed by stereolithography. In particular exposure techniques are described that complete the solidification of the building material. Other post-processing steps are also disclosed such as steps of filling-in or sanding-off surface discontinuities. |
| 5,104,592 | Hull | Discloses various techniques for reducing distortion, and particularly curl-type distortion, in objects being formed by stereolithography. |
| 5,123,734 | Spence, et al. | Discloses techniques for calibrating a scanning system. In particular techniques for mapping from rotational-mirror coordinates to planar target-surface coordinates are disclosed |
| 5,133,987 | Spence, et al. | Discloses the use of a stationary mirror located on an optical path between the scanning mirrors and the target surface to fold the optical path in a stereolithography system. |
| 5,174,931 | Almquist, et al. | Discloses various doctor blade configurations for use in forming coatings of medium adjacent to previously solidified laminae. |
| 5,182,056 | Spence, et al. | Discloses the use of multiple wavelengths in the exposure of a stereolithographic medium. |
| 5,182,715 | Vorgitch, et al. | Discloses various elements of a large stereolithographic system. |
| 5,184,307 from app. no. 07/331,644 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,209,878 | Smalley, et al. | Discloses various techniques for reducing surface discontinuities between successive cross-sections resulting from a layer-by-layer building technique. Disclosed techniques include use of fill layers and meniscus smoothing. |
| 5,234,636 | Hull, et al. | Discloses techniques for reducing surface discontinuities by coating a formed object with a material, heating the material to cause it to become flowable, and allowing surface tension to smooth the coating over the object surface. |
| 5,238,639 | Vinson, et al. | Discloses a technique for minimizing curl distortion by balancing upward curl to downward curl. |
| 5,256,340 and 08/766,956 | Allison, et al. | Discloses various build/exposure styles for forming objects including various techniques for reducing object distortion. Disclosed |

-continued

| Patent No. Application No. | Inventor | Subject |
| --- | --- | --- |
| | | techniques include: (1) building hollow, partially hollow, and solid objects, (2) achieving more uniform cure depth, (3) exposing layers as a series of separated tiles or bullets. |
| 5,321,622 | Snead, et al. | Discloses a program called CSlice which is used to convert three-dimensional object data into cross-sectional data. Disclosed techniques include the use of various Boolean operations in stereolithography. |
| 5,597,520 and 08/428,951 | Smalley, et al. | Discloses various exposure techniques for enhancing object formation accuracy. Disclosed techniques address formation of high-resolution objects from building materials that have a Minimum Solidification Depth greater than one layer thickness and/or a Minimum Recoating Depth greater than the desired object resolution. |
| 08/722,335 | Thayer, et al. | Discloses build and support styles for use in a selective deposition modeling system. |
| 08/9i722,326 | Earl, et al. | Discloses data manipulation and system control techniques for use in a selective deposition modeling system. |
| 08/790,005 | Almquist, et al. | Discloses various recoating techniques for use in stereolithography. Disclosed techniques include 1) an ink jet dispensing device, 2) a fling recoater, 3) a vacuum applicator, 4) a stream recoater, 5) a counter-rotating roller recoater, and 6) a technique for deriving sweep extents. |
| 08/792,347 | Partanen, et al. | Discloses the application of solid-state lasers to stereolithography. |
| 08/847,855 | Partanen, et al. | Discloses the use of a pulsed radiation source for solidifying layers of building material and in particular the ability to limit pulse firing locations to only selected target locations on a surface of the medium. |
| 08/855,125 | Nguyen, et al. | Discloses techniques for interpolating originally supplied cross-sectional data descriptive of a three-dimensional object to produce modified data descriptive of the three-dimensional object including data descriptive of intermediate regions between the originally supplied cross-sections of data. |

The following two books are also incorporated by reference herein as if set forth in full: (1) Rapid Prototyping and Manufacturing: Fundamentals of Stereolithography, by Paul F. Jacobs; published by the Society of Manufacturing Engineers, Dearborn Mich.; 1992; and (2) Stereolithography and other RP&M Technologies: from Rapid Prototyping to Rapid Tooling; by Paul F. Jacobs; published by the Society of Manufacturing Engineers, Dearborn Mich.; 1996.

SUMMARY OF THE DISCLOSURE

An object of the present invention is to provide the data necessary to more fully automate the recoating processes used in stereolithography.

An additional object of the invention is to provide a more efficient stereolithography apparatus for forming three-dimensional objects.

A further object of the invention is to provide a stereolithography apparatus for forming more accurate objects.

A first aspect of the invention provides a method of producing a three-dimensional object from a plurality of adhered laminae formed from a material capable of selective physical transformation upon exposure to prescribed stimulation, including the steps of: supplying data representing the object to be formed; forming a layer of material over any previously formed adjacent lamina; selectively exposing the layer of the material to prescribed stimulation in accordance with the data to form a next lamina of the object and to adhere said next lamina to any previously formed adjacent lamina; repeating the forming and exposing steps a plurality of times to form the three-dimensional object; processing the data to identify which laminae are identified with a desired geometric feature; and wherein the step of forming, for at least some layers, comprises utilization of a first recoating style when the adjacent lamina includes the desired geometric feature and comprises utilization of a second recoating style when the adjacent lamina does not include the desired geometric feature.

A second aspect of the invention provides a method of producing a three-dimensional object from a plurality of adhered laminae formed from a material capable of selective physical transformation upon exposure to prescribed stimulation, including the steps of: supplying data representing the object to be formed; forming a layer of material over any previously formed adjacent lamina; selectively exposing the layer of the material to prescribed stimulation in accordance with the data to form a next lamina of the object and to adhering said next lamina to any previously formed adjacent lamina; repeating the forming and exposing steps a plurality of times to form the three-dimensional object; processing the data to identify which laminae include a trapped volume; and wherein the step of forming, for at least some layers, comprises utilization of a first recoating style when the adjacent lamina has an associated trapped volume and comprises utilization of a second recoating style when the adjacent lamina does not include a trapped volume.

A third aspect of the invention provides a method for analyzing data representing a three-dimensional object, said three-dimensional object to be physically formed on a lamina-by-lamina basis, to derive data descriptive of the laminae that have associated with a desired trapped volume region, including the steps of: supplying data descriptive of the three-dimensional object; deriving a potential trapped volume region associated with lamina N by unioning any up-facing regions associated with lamina N−1 and any trapped volume regions associated with lamina N−1; identifying individual holes associated with lamina N; comparing the individual holes associated with lamina N to the potential trapped volume region associated with lamina N; and identifying a trapped volume as being associated with lamina N if at least one individual hole for lamina N has an overlap with the potential trapped volume region associated with lamina N which is greater than a predetermined criteria.

Additional aspects of the invention provide apparatus for performing the method related aspects of the invention noted above.

A first embodiment of the of the invention provides a technique for Complete Trapped Volume Detection when horizontal boundary regions form closed loops of solidified material.

A second embodiment of the invention provides a technique for Partial Trapped Volume Detection when horizontal boundary regions formed closed loops of solidified material.

A third embodiment of the invention provides a technique for identifying most if not all extended regions of trapped volumes based on their effective existence in those regions even though they were actually completed on a previous lamina.

A fourth embodiment of the invention provides a technique for identifying a portion of the extended regions of trapped volumes based on their effective existence in those regions even though they were actually completed on a previous lamina.

A fifth preferred embodiment of the invention provides a technique for identifying trapped volumes which have not resulted solely from complete closed loops but also result from loops that contain small breaches.

Additional embodiments provide techniques for identifying whether or not a lamina as a whole, or in part, or when combined with other lamina, either in whole or in part, meet a particular size requirement.

Upon finding the trapped volume or other geometric feature of the object or partially completed object, the parameters pertaining to each trapped volume or other geometric feature may be provided to a recoating apparatus in combination with a look up table, or the like, which relates recoating parameters to geometric features for automatically determining recoating parameters.

Further objects and aspects of the invention involve the achievement of the above noted objects and practice of the above noted aspects of the invention alone or in combination. These and other objects, aspects, and advantages of the present invention will be better understood by studying the detailed description in conjunction with the drawings and the accompanying claims.

BRIEF DESCRIPTION OF THE DRAWINGS

A detailed description of embodiments of the invention will be made with reference to the accompanying drawings, wherein like numerals designate corresponding parts in the several figures.

FIG. 8a illustrates the use of a Boolean operation to insert a hole in a solid region;

FIG. 8b illustrates the case in which the hole overlaps the external boundary of a solid region;

FIGS. 11a–11d illustrate top views of the regions defined by the down-facing boundaries, the up-facing boundaries, the continuing boundaries and the initial cross-section boundary for cross-section 1 in a modified bit map form;

FIGS. 17a–17d illustrate bitmap representations of various boundary regions for cross-section 1;

FIGS. 18a–18d illustrate bitmap representations of various boundary regions for cross-section 2;

FIGS. 19a–19d illustrate bitmap representations of various boundary regions for cross-section 3;

FIGS. 20a–20d illustrate bitmap representations of various boundary regions for cross-section 4;

FIGS. 21a–21d illustrate bitmap representations of various boundary regions for cross-section 5;

FIGS. 22a–22d illustrate bitmap representations of various boundary regions for cross-section 6;

FIGS. 24a–24f illustrate various boundary representations for each lamina of the object shown in FIG. 23a;

FIGS. 25a–25f illustrate various boundary representations for each lamina of the object shown in FIG. 23a;

FIGS. 26a–26e illustrate various boundary representations used in an embodiment of the present invention for determining trapped volume extensions of the object shown in FIG. 23a.

DETAILED DESCRIPTION OF THE PREFERRED EMBODIMENTS

As explained above, a trapped volume is a region of unsolidified material effectively held within that region by solidified material below the region (e.g. by up-facing regions) and solidified material to the sides of the region (e.g. cross-sectional boundaries). During formation of a right side up bowl, laminae having trapped volume configurations would exist for those object cross-sections which include the walls of the bowl and which are also located above the laminae forming the bottom of the bowl.

Figure 1:
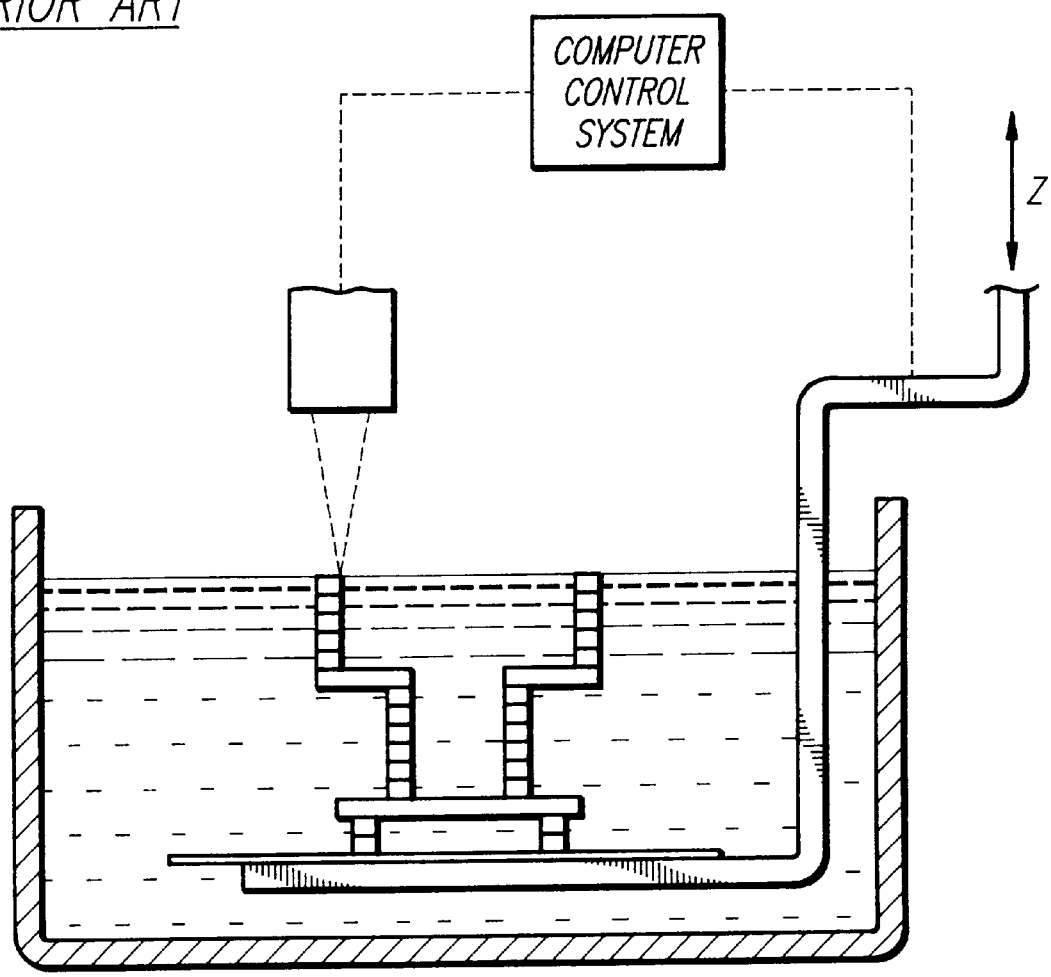
FIG. 1 illustrates a combined block diagram, schematic and elevational sectional view of a prior art stereolithography system for practicing the present invention.
Figure 2A:
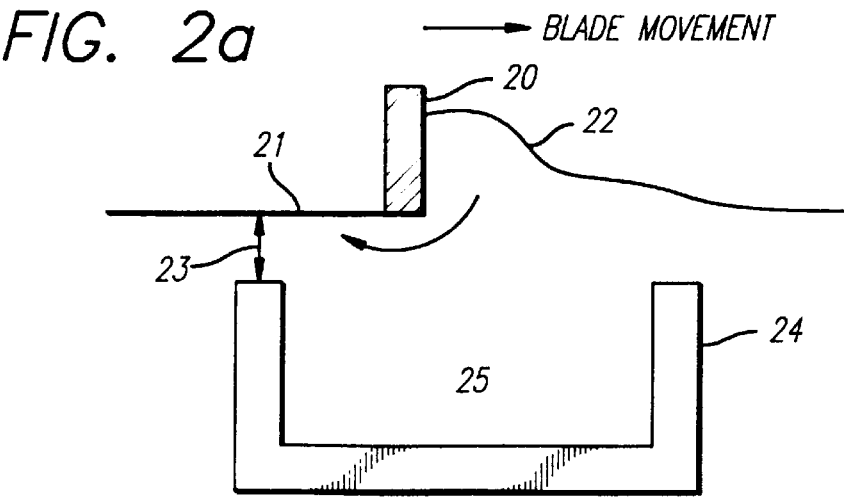
FIG. 2a illustrates one of the trapped volume problems.
Figure 2B:
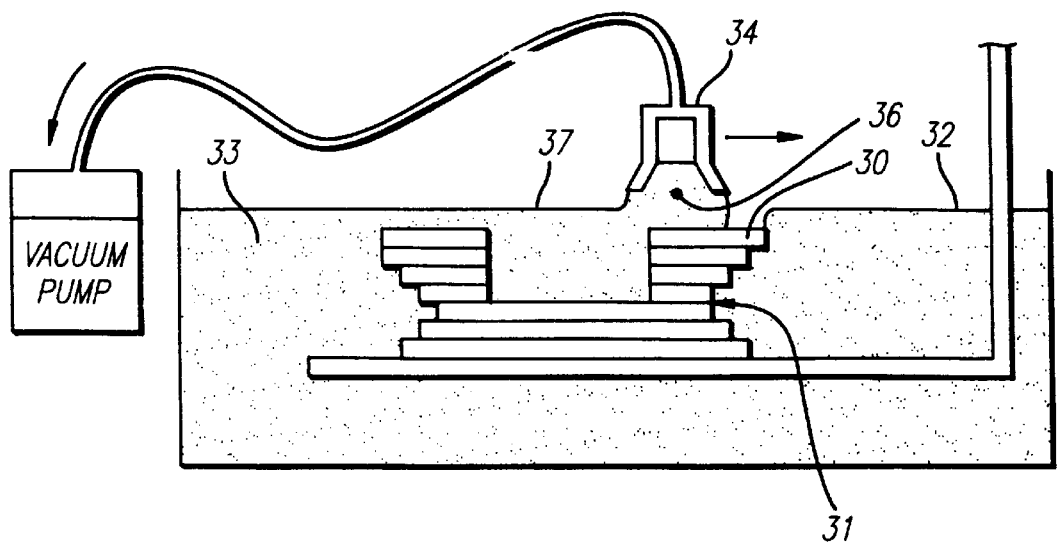
FIG. 2b illustrates a recoating process using an applicator blade.
Figure 3A:
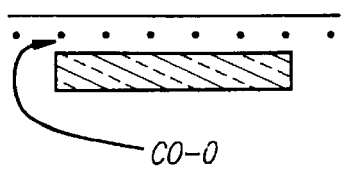
FIG. 3a–3l illustrate 12 side views involving the recoating for and build-up of six laminae of a bowl-like object.
Figure 3B:
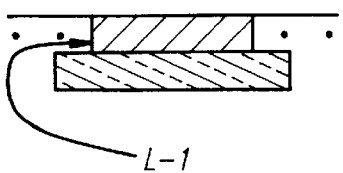
Figure 3C:
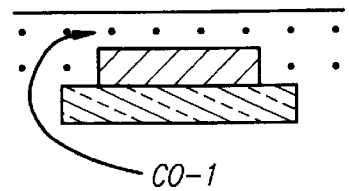
Figure 3D:
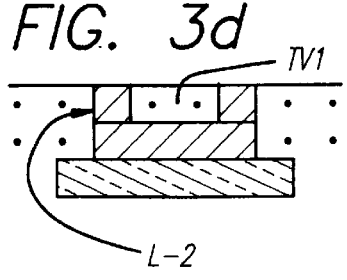
Figure 3E:
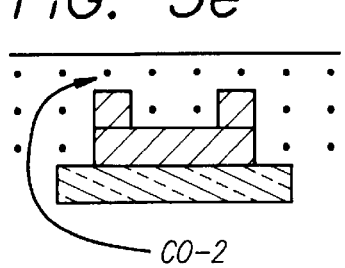
Figure 3F:
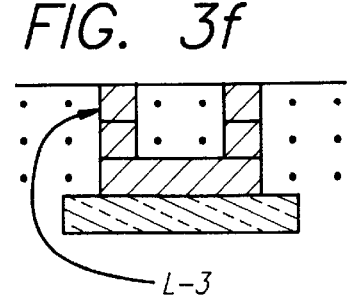
Figure 3G:
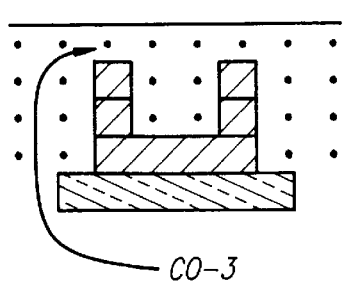
Figure 3H:
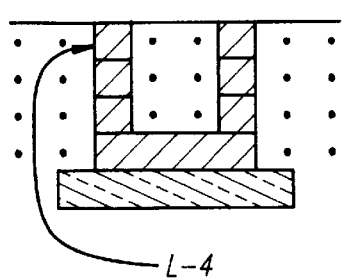
Figure 3I:
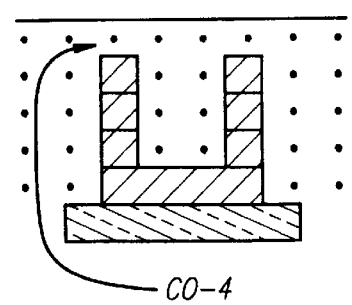
Figure 3J:
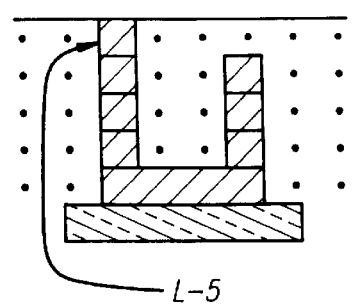
Figure 3K:
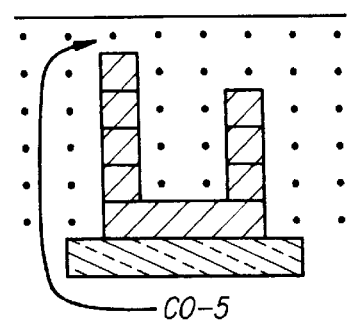
Figure 3L:
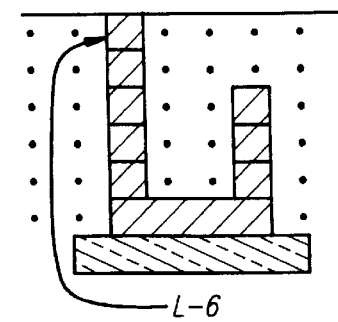
Figure 4:
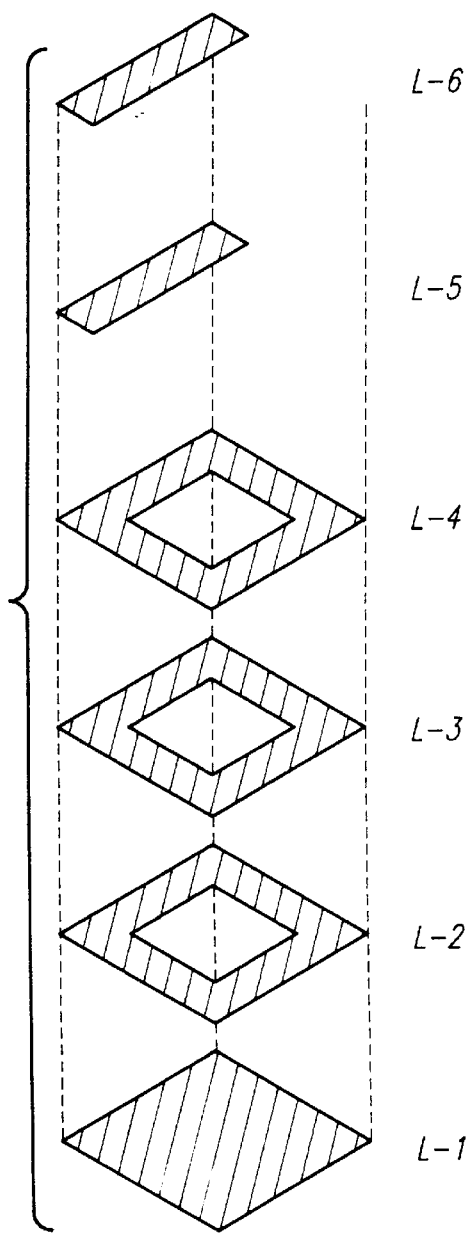
FIG. 4 illustrates an exploded isometric view of the object of FIG. 3.

The concept of recoating and trapped volumes is illustrated in FIG. 3a–3l. FIG. 3a–3l comprise 12 side views involving the alternating steps of recoating for and build up of six laminae of a bowl-like object. The elements of FIGS. 3a–3l are discussed below. FIG. 4 depicts an exploded isometric view of the object of FIG. 3a–3l. Like elements of both FIGS. 3a–3l and 4 are depicted with the same reference numbers.

Element CO-0 (FIG. 3a) depicts a coating of unsolidified material over a flat plate-like structure wherein the coating is formed in preparation for forming a first lamina of an object. Element L-1 (FIG. 3b & FIG. 4) depicts the formation of lamina 1 as a solid plate-like structure. Element CO-1 (FIG. 3c) depicts formation of a coating over lamina 1 (or the formation of a coating in preparation for forming lamina 2). The coating (i.e. recoating) parameters utilized should be appropriate for forming a coating over a flat plate-like structure.

Element L-2 (FIG. 3d & FIG. 4) depicts formation of lamina 2 as a ring-like structure. The combination of laminae 1 and 2 form a trapped volume TV1. Element CO-2 (FIG. 3e) depicts the formation of a coating over lamina 2. The trapped volume existing on lamina 2 may be considered when selecting appropriate recoating parameters to use.

Element L-3 (FIG. 3f & FIG. 4) depicts formation of lamina 3 as a ring-like structure. The combination of laminae L-1, L-2 and L-3 continue formation of a trapped volume. Element CO-3 (FIG. 3g) depicts formation of a coating over lamina 3. The trapped volume existing on lamina 3 may be considered when selecting recoating parameters to use.

Element L-4 (FIG. 3h & FIG. 4) depicts formation of lamina 4 as a ring-like structure. The combination of laminae 1–4 continue formation of a trapped volume. Element CO-4 (FIG. 3i) depicts the formation of a coating over lamina 4. The trapped volume existing on lamina 4 may be considered when selecting coating parameters to use.

Element L-5 (FIG. 3j & FIG. 4) depicts formation of lamina 5 which is in the form of a single elongated element. As lamina 5 doesn't form a ring which entraps material in the trapped volume region of laminae 2–4. This lamina represents the first lamina not containing a trapped volume but which is located above a trapped volume. Element CO-5 (FIG. 3k) depicts the formation of a coating over lamina 5. Though a trapped volume does not exist on lamina 5, a trapped volume did exist on lamina 4 which yields a flow path having a thickness approximately equal to two layer thicknesses above the trapped volume. Depending on the area of the previous trapped volume, the layer thickness, the viscosity of the material, and the horizontal size of the opening, it may be appropriate to consider lamina 5 as an extended trapped volume and thereby to use coating parameters appropriate for handling a trapped volume.

Element L-6 (FIG. 3l) depicts formation of lamina 6 as a single elongated element. If another lamina is to be formed and therefore a subsequent coating to be formed, and as only a flow path of approximately three layer thickness exists, it may or may not be appropriate to consider lamina 6 as an extended trapped volume and to again form a coating using coating parameters appropriate for handling a trapped volume.

A trapped volume will end or be completed on lamina N–1 if it exists due to the formation of lamina N–1 and does not exist due to the formation of lamina N. As noted above the effectiveness of a trapped volume may continue beyond the lamina on which it ends. A trapped volume may become completed or end on lamina N–1 in two ways: (1) it may be closed off by material being solidified on a lamina N (e.g., due to a down-facing region being solidified on lamina N), or (2) it may be laterally breached when lamina N contains insufficient solidified material to completely or effectively laterally bound the trapped volume region (this might occur due to the non-solidification of material bordering an edge of the trapped volume). Situation 2 might occur when a wall of the potential trapped volume on lamina N has a hole in it. In the first situation the impact of the trapped volume ends after forming the coating over lamina N–1. In the second situation, the effective impact of the trapped volume may continue to the formation of coatings over lamina N or beyond.

Figure 5:
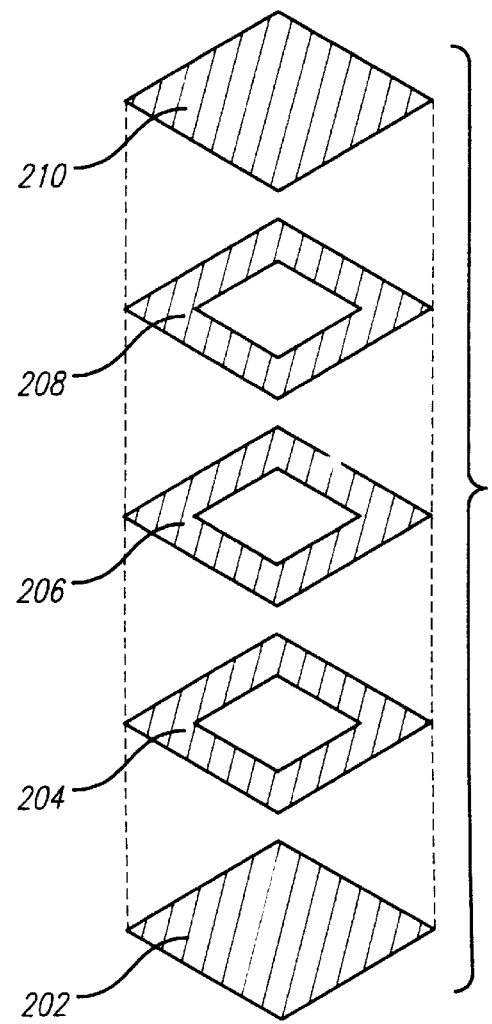
FIG. 5 illustrates an exploded isometric view of the first five laminae forming an object.

FIG. 5 depicts an exploded isometric view of the first five laminae forming an object. Trapped volumes exist for the second 204, third 206, and fourth 208 laminae of the object. The fourth laminae 208 is the last laminae containing an absolute or effective trapped volume since the fifth lamina 210 closes off the trapped volume with a solidified structure.

As such, no effective vertical extension of the trapped volume can exist. The effects of the trapped volume on subsequent layers is removed as recoating over lamina N in preparation for forming lamina N+1 requires formation of a coating over a solidified region as opposed to over a trapped volume region.

As noted above, a trapped volume region may effectively exist even if small holes or openings exist in the walls or floor of the region. Small openings, though allowing some flow of material into or out of the region, may be of such a size so as to significantly restrict the flow of material and thereby still resulting in the effective trapping of material. Effective trapping of material may be said to occur when the flow of liquid medium between the inside and outside and/or outside and inside of the trapped volume is restricted to such an extent that the liquid level inside the trapped volume and liquid level outside the trapped volume, once displaced relative to the other, do not attain the same level within a desired time period. Depending on the circumstances, the time period would typically be in the range of 1–120 seconds, more preferably within 1–60 seconds, and even more preferably within 1–30 seconds.

Figure 6:
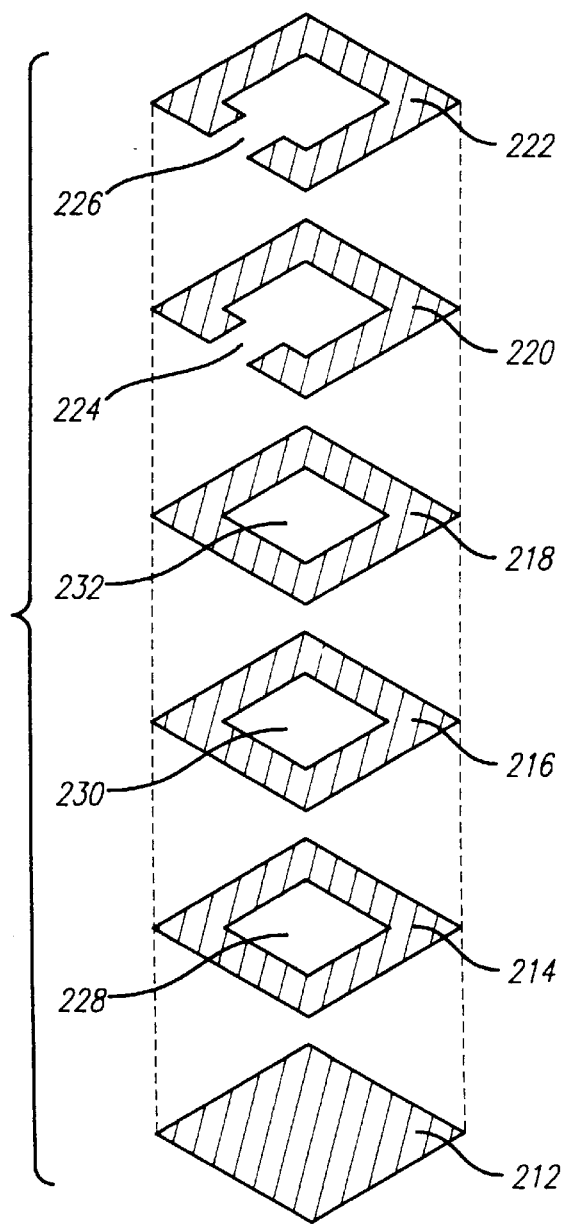
FIG. 6 illustrates an exploded isometric view of laminae of an object wherein some of the lamina have horizontal breaches.
Figure 7:
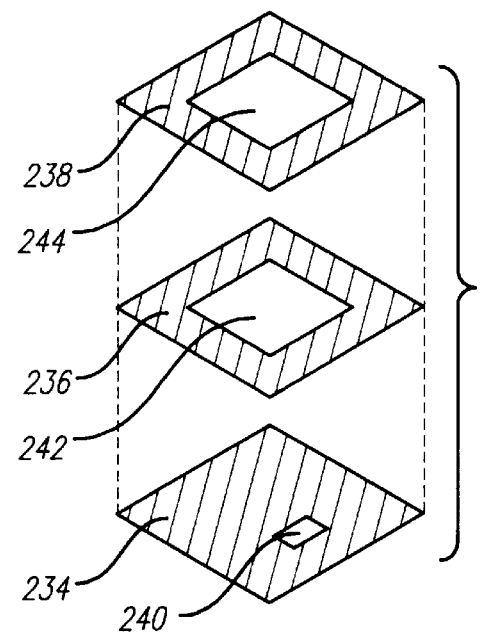
FIG. 7 illustrates an exploded isometric view of three laminae forming an object.

The issue of small openings is illustrated in FIGS. 6 and 7. FIG. 6 depicts exploded isometric views of laminae forming an object where small horizontal breaches 224 and 226 exist in the top two layers 220 and 222, respectively. In FIG. 6 the first lamina 212 forms a floor like structure while the next three laminae 214, 216, and 218 form wall-like structures which trap unsolidified building material within the rectangular areas 228, 230, and 232, respectively, defined by these laminae. As such, the second 214 through fourth laminae 218 contain trapped volumes. The fifth lamina 220, on the other hand, includes a small horizontal gap 224 that may or may not effectively remove the trapped volume nature of the fifth lamina 220. Whether or not the breach in the fifth lamina 220 breaks the trapped volume depends on several factors which include the dimensional characteristics of the trapped volume itself and the viscosity/surface energy parameters of the liquid and solidified building material. Similarly, the sixth lamina 222 includes a breach 226 that again may or may not destroy the trapped volume nature of the sixth lamina 222. In addition to those factors which influence the nature of the trapped volume associated with the fifth lamina, the factors influencing the nature of the trapped volume associated with the sixth lamina 222 include the size of the opening 224 on fifth lamina. For example, it is possible that the size of the openings 224 and 226 on the fifth 220 and sixth laminae 222, respectively, taken alone still result in the effective formation of a trapped volume. However, when the breaches 224 and 226 are combined, they might yield a result which eliminates the effect of a trapped volume.

FIG. 7 depicts an exploded isometric view of three laminae forming an object. The first lamina 234 contains a small hole 240 toward the center of the lamina. The second and third laminae, 236 and 238, respectively, form rectangular rings 242 and 244 of solidified material surrounding unsolidified material. The small hole 240 in the first lamina 234 is located below the unsolidified material within the rings of the second and third laminae. Depending on the size of this small hole 240, effective trapped volumes may or may not exist on the second and third laminae.

FIGS. 3a–3l, 4, 6, and 7 depict objects with laminae where vertical extensions of the trapped volumes may be appropriate as the trapped volume's influence may extend beyond the fourth L-4 (FIG. 3h and FIG. 4), fourth 218 or even sixth 222 (FIG. 6), and third laminae 238 (FIG. 7), respectively. As a result of building with relatively thin layers and the relatively viscous nature of typical liquid building materials used, adequate flow of material through a breach (either partial or complete) may not exist when forming the next one or more subsequent coatings (i.e., coatings formed in preparation for forming laminae N+1, N+2, etc.) due to the relatively thin vertical component of the flow path available for the material (i.e., 2 layer thicknesses in preparation for forming lamina N+1, 3 layer thickness for lamina N+2, etc.). Once the opening is of sufficient size (i.e., height and width) the effect of the trapped volume on recoating is eliminated. As such, if the size of the opening does not have sufficient height in combination with sufficient width, the trapped volume effects continue to impact the formation of coatings over successive laminae. In practice, it is not uncommon to see vertical opening heights of up to 0.5 to 2.0 mm, or more, still presenting effective trapped volumes. Similarly, narrow horizontal breaches of up to several millimeters or more (assuming a vertical height of at least 0.5 to 2.0 mm) have been observed to limit flow sufficiently to produce trapped volume effects.

In cases of vertically limited openings, trapped volume recoating parameters are optimally utilized in coating over the next M laminae (i.e., lamina N, N+1, . . . , and N+M−1 when a trapped volume is completed by the formation of lamina N−1). If 4 mil layers are being used, M may be in the range of 5 to 20 layers or more. During the discussion to follow regarding vertical trapped volume extensions, it will be assumed that a trapped volume's influence extends to the recoating processes to be used in coating over the "M" immediately succeeding laminae (N, . . . , N+M−1) above the lamina (N−1) on which the trapped volume was completed.

In cases of horizontally limited openings, trapped volume recoating parameters are optimally utilized for openings less than "W" mm in width. In some embodiments W may be between 0.5 and 2.0 mm.

As recoating parameters are typically set for an entire layer, it may be unnecessary to look at the completion of trapped volumes on an individual basis. In other words it may not be necessary to determine on which layer an individual trapped volume ends. Instead it may be acceptable to simply determine which laminae do not contribute to any trapped volumes and which consecutively follow previously formed laminae which contribute to one or more trapped volumes. These initial non-trapped volume laminae may be used as the first of M consecutive laminae to be identified as containing extended trapped volumes. This may be conceptually understood by simply considering which laminae contain one or more trapped volumes, which laminae contain no trapped volumes, and which laminae represent transitions from trapped volume laminae to non-trapped volume laminae.

A method of producing a layer-by-layer formation of a three-dimensional object through application of the principles of stereolithography, and more specifically, to automatically detect surface features of each layer of a three-dimensional object according to an embodiment of the invention is shown in the drawings for purposes of illustration.

A preferred embodiment involves manipulation of an STL representation of an object prior to or during the slicing process. The STL format is a tesselated triangle format, in which the triangles substantially span the surface of the object, and each triangle is represented by its three vertices (in an exemplary embodiment, the three vertices are each represented by three floating point numbers, and are ordered in accordance with the "right-hand rule") and a normal vector. Additional details about the STL format are provided in U.S. Pat. Nos. 5,059,359; 5,137,662; 5,312,622; and 5,354,391, all of which are incorporated herein by reference as though set forth in full. The '622 patent describes the use of Boolean operations in determining which portions of each layer continue from the previous layer through the present layer and through the next successive layer and which portions are up-facing or down-facing or both. Therefore, the '622 patent describes methods and apparatus for deriving initial data associated with each layer, and comparing initial data between layers to form resulting data that may be used in the process of physically reproducing the object. This patent describes what may be referred to as the CSlice or Contour Slice program.

The CSlice program described in the '622 patent produces at least three types of boundaries descriptive of an object layer: up-facing boundaries (UB); continuing or layer boundaries (CB or LB); and down-facing boundaries (DB). The UB define boundaries which encircle up-facing regions that exist on that layer. The CB define boundaries which encircle continuing regions and the DB define boundaries which encircle down-facing regions on that layer.

In performing its operations, CSlice produces a larger number of other boundaries, such as intermediate up-facing boundaries, initial cross-section boundaries, etc., in deriving these final three. These three boundary types define mutually exclusive regions. In the derivation of these three boundaries, an Intermediate Up-facing Boundary (IUB) exists. The IUB contains boundaries which encircle all up-facing regions including any regions which are simultaneously down-facing part of a down-facing region. As down-facing regions typically have stricter formation criteria than up-facing regions and as it is desired that down-facing regions and up-facing regions be independent, further processing by the CSlice program, removes any down-facing regions from the IUB regions to produce the final UB regions.

The CSlice program initially forms what might be called the initial cross-section boundaries (ICSBs) which define the entire cross-sectional region of an object for a particular layer of the object (i.e. lamina, layer of structure, or object layer). Typically the ICSB are defined according to a desired object sizing style, for example, an oversized or undersized style. The ICSB for laminae N, N−1 and N+1 are compared to yield various intermediate boundary types which are further processed to yield the final DBs (Down-facing Boundaries), UBs (Up-facing Boundaries) and CBs (Continuing Boundaries) for laminae N.

In implementing a preferred embodiment of the present invention, any of the final three-boundary types may be used for each cross-section or the ICSB or even appropriate intermediate boundary types may be used. Other preferred embodiments can utilize different initial data and/or different initial data structures. The UB, CB, and DB information created by the CSlice is preferably in the form of polylists. Each polylist is an ordered sequence of line segments which circumscribe a solid or hollow feature of the object. The order of the coordinates preferably obeys the right-hand rule. In accordance with this rule, the segments are ordered in a counter-clockwise direction if they define an exterior boundary of the object, i.e., circumscribe a solid portion of the object. Conversely, if they define an interior boundary of the object, i.e., circumscribe a hollow portion of the object, the segments will be ordered in a clockwise direction.

Alternatively, it may be said that the boundary orientation is selected such that the sum of cross-products of consecutive boundary segments results in a positive value if a solid portion is circumscribed and a negative value if a hollow portion is circumscribed.

For example, the above convention is illustrated in FIG. 8a. The circle identified with numeral 40 depicts the curve defined by a polylist which is representative of a border (whether continuing, up-facing, down-facing, or a combination) enclosing a solid area. In accordance with the right-hand rule, the segments (not shown) making up the polylist are ordered in a counter-clockwise direction. The circle identified with numeral 42, on the other hand, depicts a polylist which represents a hole. In accordance with the right-hand rule, the segments making up the polylist are ordered in a clockwise direction since a hole by definition encloses a hollow region. Of course a boundary or border by definition separates two distinct regions. It bounds "solid" of a particular type on one side and "hollow" (i.e. a non-solid of the particular type) on the other. So what is within the region defined by boundary 40 is a solid and what is outside the region is hollow. Similarly what is within the region defined by boundary 42 is a hollow and what is outside the region then by definition must be a solid. For the case in which boundary loop 42 falls completely within boundary loop 40, the merging of these two loops produces a ring shaped solid element identified with numeral 44. This merging of boundaries is equivalent performing a Boolean "AND" or intersection operation on the solid areas represented by these boundaries.

It should be appreciated that there is no requirement that holes fit within a single tesselated triangle, or even within a particular continuing, up-facing or down-facing region. This situation is illustrated in FIG. 8b. As shown, polylist 40, representing a boundary region surrounding a solid, is Boolean intersected with the region defined by polylist 42' which, as shown, encircles a hole which is not entirely encompassed by the region bounded by polylist 40. The result of this operation is the solid region within the boundary 48 depicted in FIG. 8b.

Basic Trapped Volume Detection—Embodiments 1 and 2
The First Embodiment

The first embodiment of the present invention provides a technique for complete trapped volume detection when horizontal boundary regions form closed loops of solidified material. This embodiment may be implemented according to the following steps.

The first step is to obtain cross-sectional information for the three-dimensional object(s) to be formed. This cross-sectional information is preferably in the form of ICSB, DB, and IUB boundary or region information as produced by the CSlice program or the like, as described above. Some alternative embodiments might use UB and CB boundaries or regions for each cross-section either in place of some of the region types noted above or in addition to those types.

In the second step, for cross-section N or layer N (starting with the lowest cross-section, CS[N]=CS[1], and working up to the final cross-section), perform the following operations in either a boundary based, raster-line based, or bitmap based data structure:

a. Define any trapped volume region identified on layer N−1 as the initial trapped volume (ITV) region for layer N ($ITV_N$);

b. Union the $ITV_N$ with $IUB_{N-1}$ (this is the net area that may be a true trapped volume on layer N) to yield the potential trapped volume (PTV) region for layer N ($PTV_N$);

c. Determine whether or not any holes exist in the $ICSB_N$ and denote such regions as initial cross section boundary hole regions ($ICSBH_N$);

d. Compare each area element (or pixel) of each hole to each area element of the $PTV_N$. For each hole that is element-by-element (or pixel-by-pixel) matched to an element of the $PTV_N$, define that hole as a trapped volume on layer N ($TV_N$). Alternatively, for each hole that has more than a set percentage of area elements matched to the $PTV_N$, define the hole as a trapped volume. Alternatively, for each hole that has less than a set area (i.e. sum of area elements) unmatched by the $PTV_N$, define the hole as a trapped volume for layer N; and e. Define $TV_N$ as the area elements for all holes meeting one or more of the conditions of step d. Output appropriate parameters pertaining to the trapped volume for use in determining recoating parameters or other parameters useful during object formation.

Once the above steps (a through e) have been completed, they are repeated for each cross-section until the last cross-section is processed.

Figure 9B:
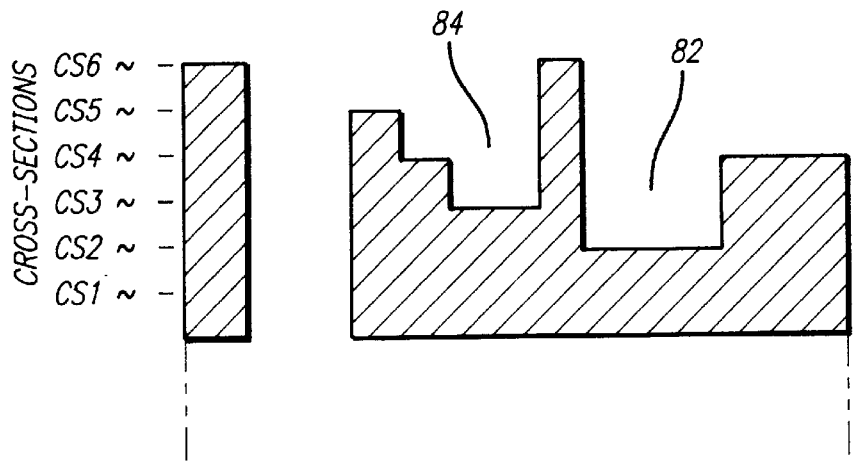
FIG. 9b illustrates a side view of the object at the plane defined by elements 9b–9b.
Figure 9A:
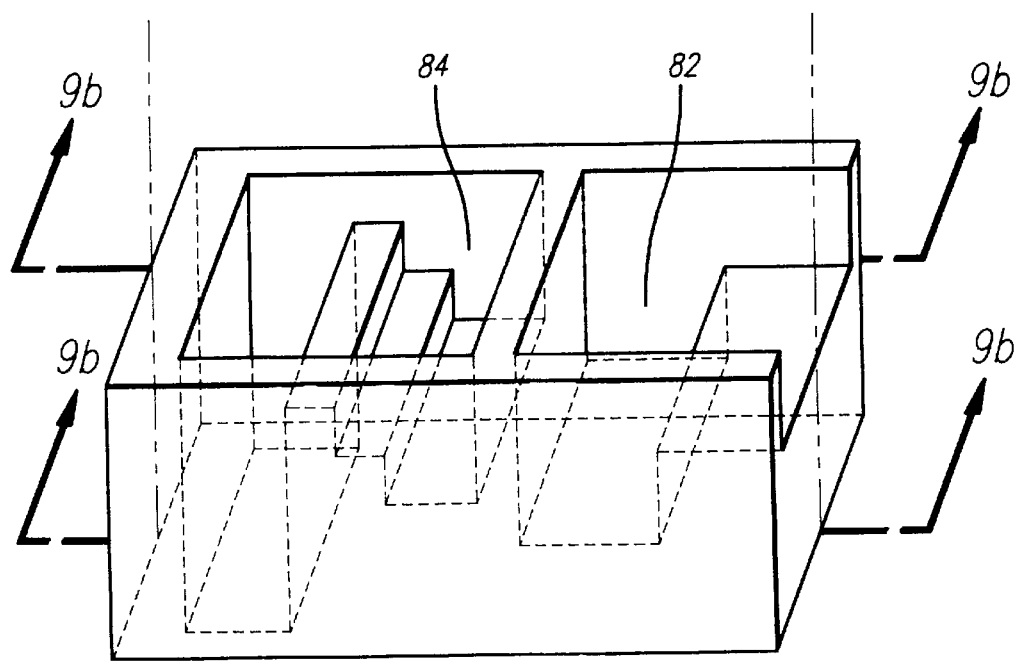
FIG. 9a illustrates an isometric view of a generally rectangular three-dimensional object with internal features.

An illustration of the application of the first embodiment of the present invention is depicted in FIGS. 9a–22d. FIG. 9a illustrates a perspective view of a generally rectangular three-dimensional object with internal features. FIG. 9b illustrates a side view of the object in FIG. 9a at the plane defined by elements 9b. As shown in FIG. 9a, the interior of the three dimensional object, has a number of features including two trapped volume regions. In particular, the trapped volume regions are shown as numerals 82 and 84 in FIGS. 9a and 9b. For purposes of illustration, the three dimensional object is sliced into six cross-sections (CS1, CS2, CS3, CS4, CS5, and CS6) spaced along the z-axis.

Figure 10A:
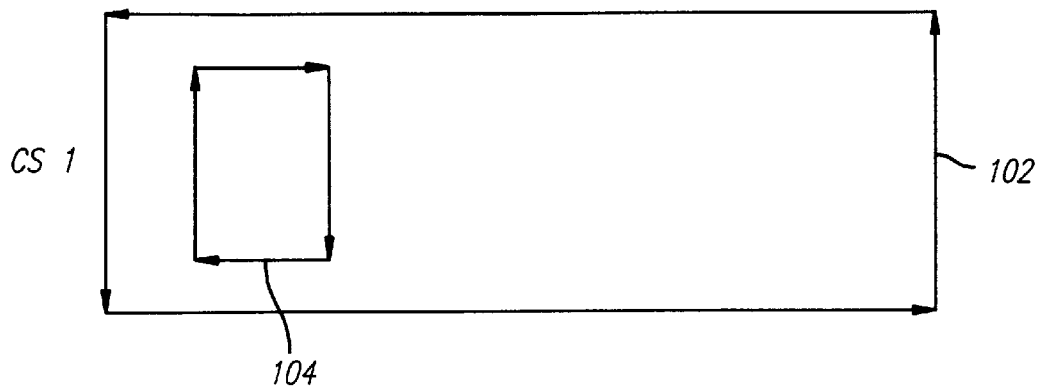
FIGS. 10a–10f illustrate top views of the cross-sectional boundary data (DB=Down-facing Boundaries, UB=Up-Facing Boundaries, and CB=Continuing Boundaries) as output by CSlice for each of the 6 cross-sections making up the object of FIGS. 9a and 9b.

FIGS. 10a–10f respectively illustrate cross-sectional representations of the six layers making up the object in FIG. 9a. In particular, each cross-section of FIGS. 10a–10f matches the slice planes of FIG. 9a. In FIG. 10a, numeral 102 represents an outer down-facing boundary surrounding an inner down-facing boundary 104. Numeral 104 is a down-facing boundary surrounding a non-down-facing region. As discussed above, the direction of the vectors in FIGS. 10a–10f is significant in determining whether the boundaries surround solid or hollow regions.

Figure 10B:
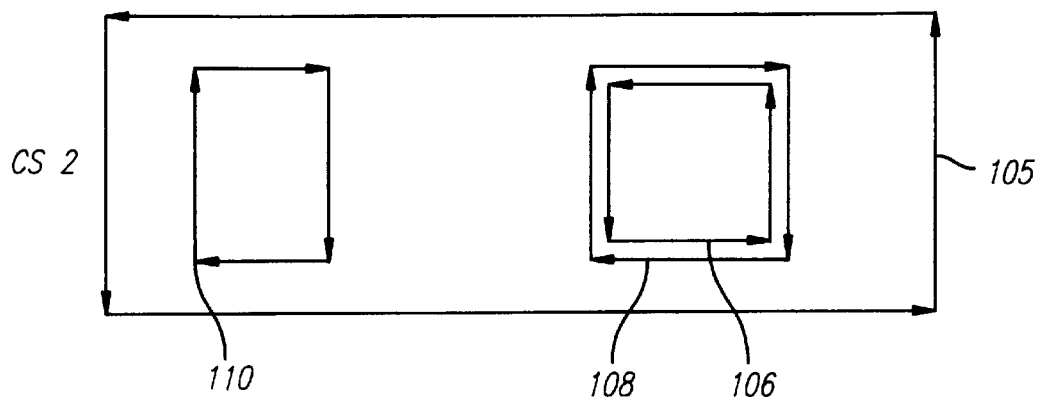

In FIG. 10b, numeral 105 represents a continuing boundary surrounding a continuing region. Numeral 106 represents an up-facing boundary surrounding an up-facing region. Numerals 108 and 110 represent continuing boundaries surrounding non-continuing regions.

Figure 10C:
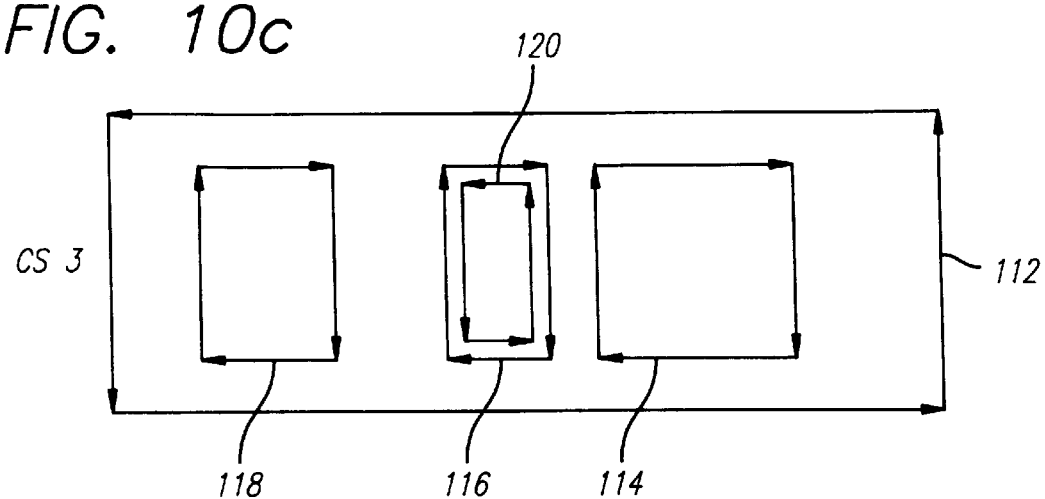

Similarly in FIGS. 10c, numerals 112, 114, 116, and 118 represent continuing boundaries surrounding non-continuing regions, and numeral 120 signifies an up-facing boundary surrounding an up-facing region.

Figure 10D:
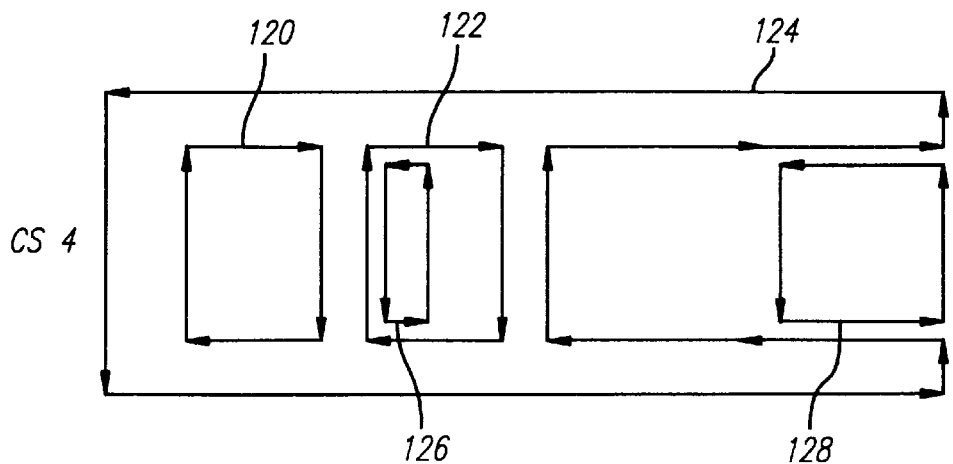

In FIG. 10d, numerals 120 and 122 denote continuing boundaries surrounding non-continuing regions; numeral 124 denotes a continuing boundary surrounding a continuing region; and numerals 126 and 128 denote up-facing boundaries surrounding up-facing regions.

Figure 10E:
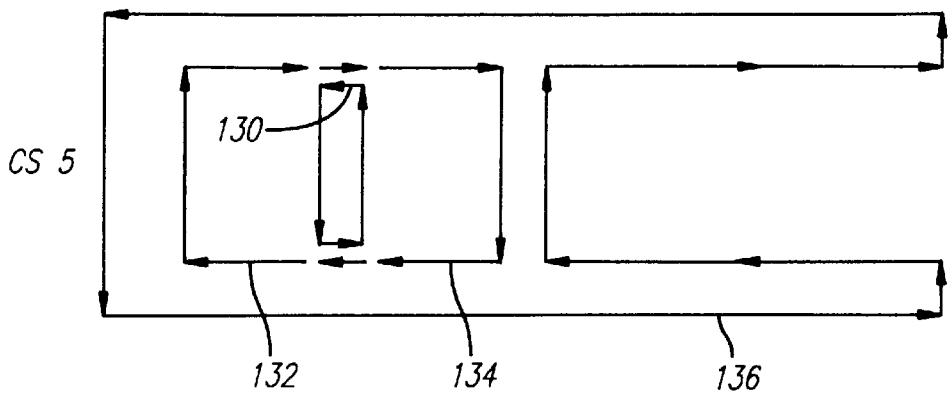

In FIG. 10e, numeral 130 denotes an up-facing boundary surrounding an up-facing region; numeral 132 denotes a continuing boundary surrounding a non-continuing region; and numeral 136 denotes a continuing boundary surrounding a non-continuing region.

Figure 10F:
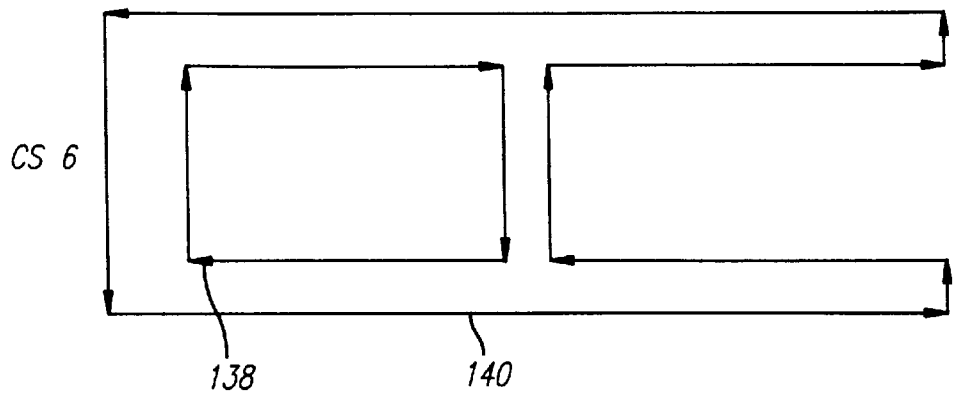
Figure 12A:
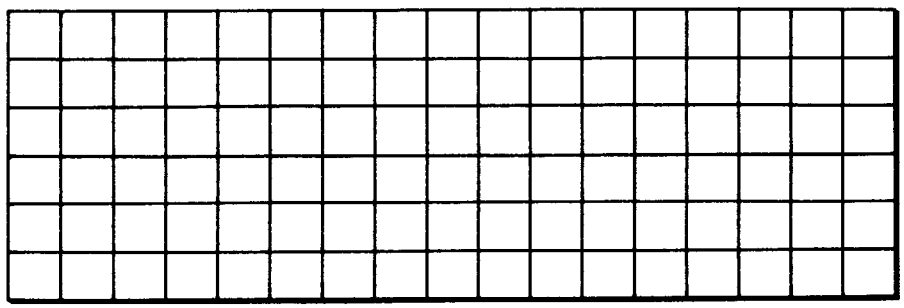
FIGS. 12a–12d illustrate counterparts of FIGS. 11a–11d for cross-section 2.
Figure 12B:
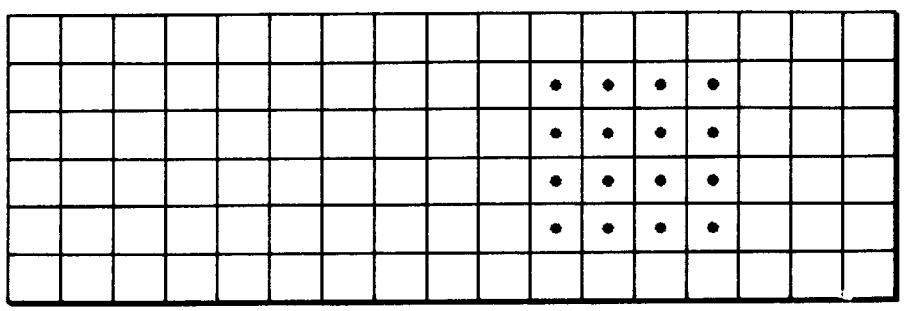
Figure 12C:
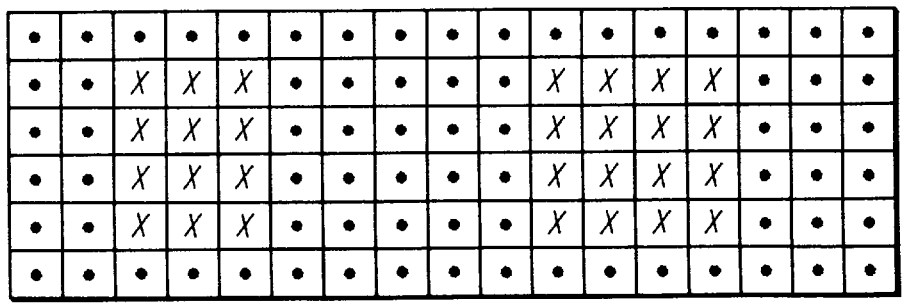
Figure 12D:
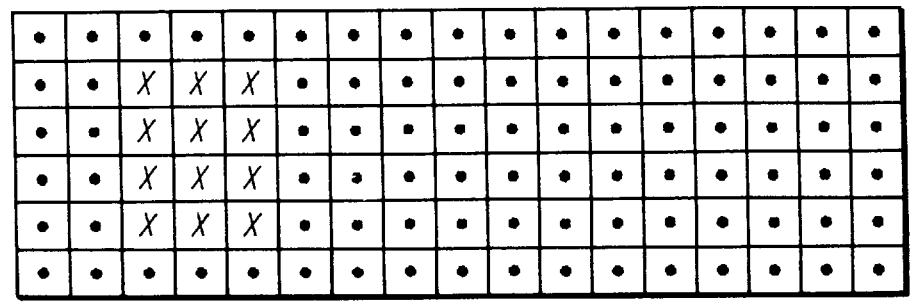
Figure 13A:
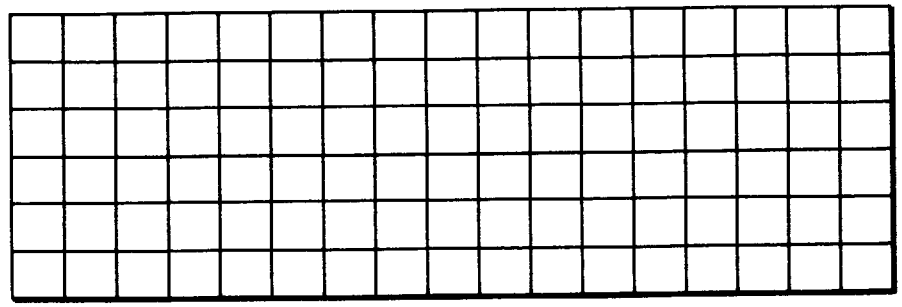
FIGS. 13a–13d illustrate counterparts to FIGS. 11a–11d for cross-section 3.
Figure 13B:
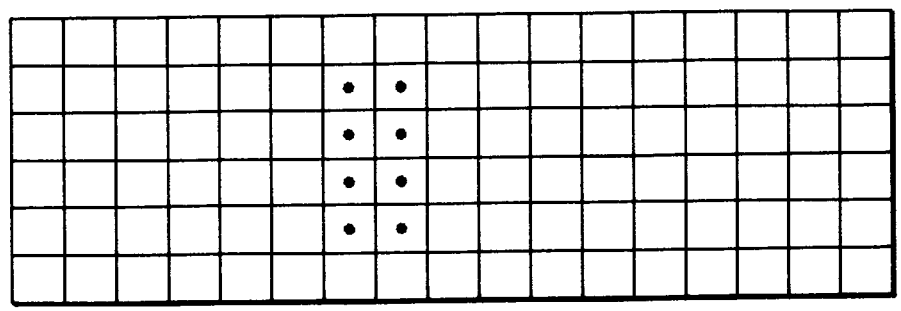
Figure 13C:
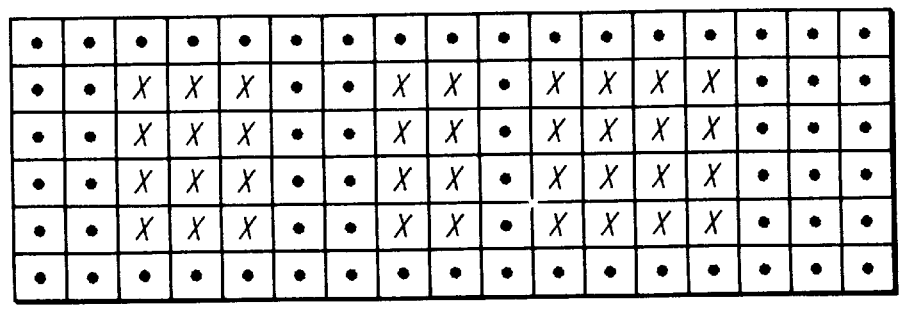
Figure 13D:
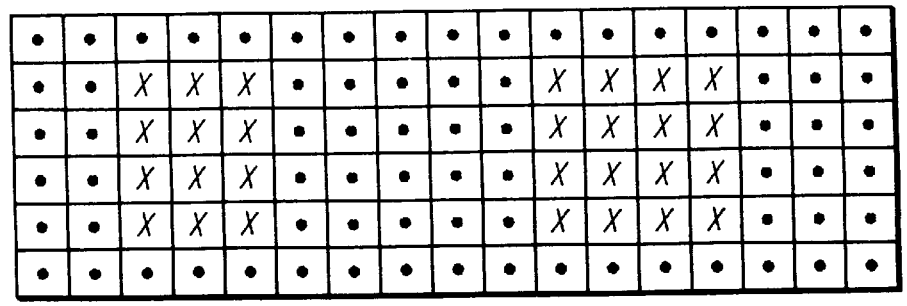
Figure 14A:
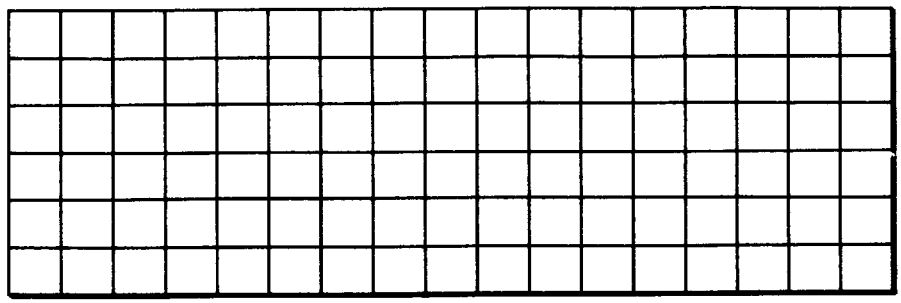
FIGS. 14a–14d illustrate counterparts to FIGS. 11a–11d for cross-section 4.
Figure 14B:
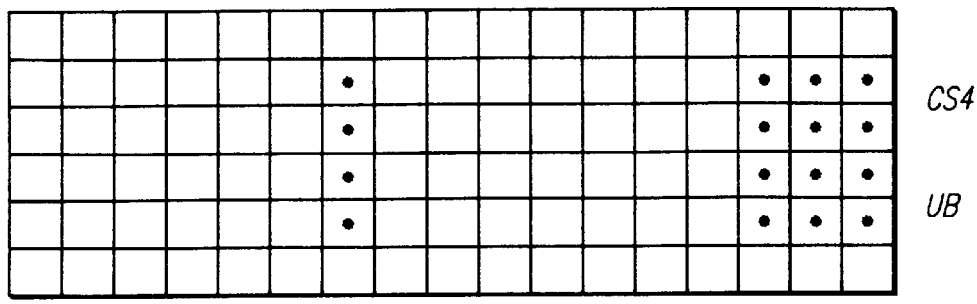
Figure 14C:
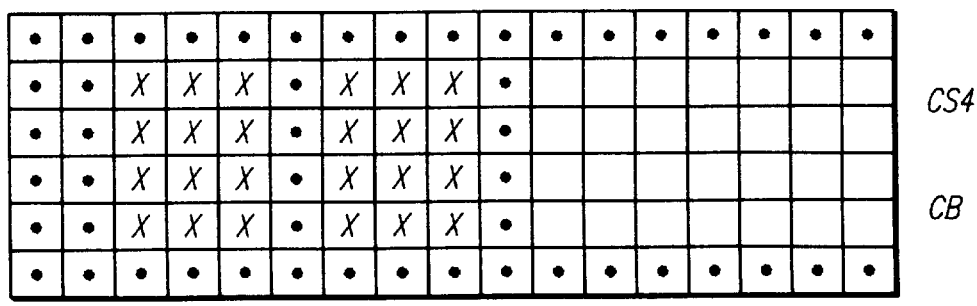
Figure 14D:
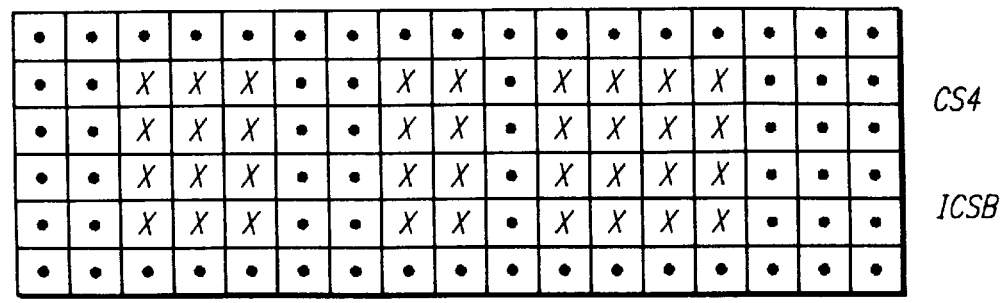
Figure 15A:
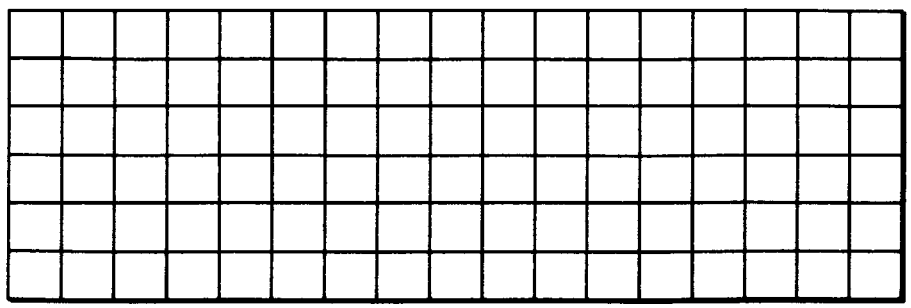
FIGS. 15a–15d illustrate counterparts to FIGS. 11a–11d for cross-section 5.
Figure 15B:
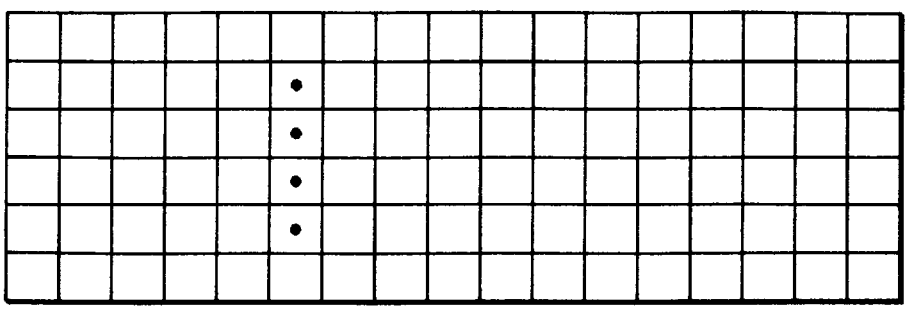
Figure 15C:
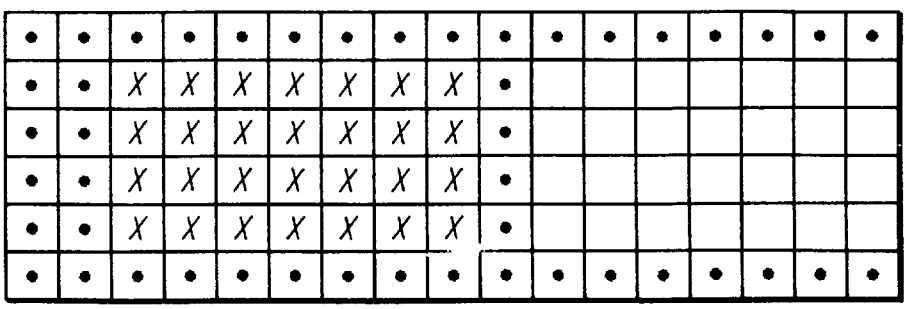
Figure 15D:
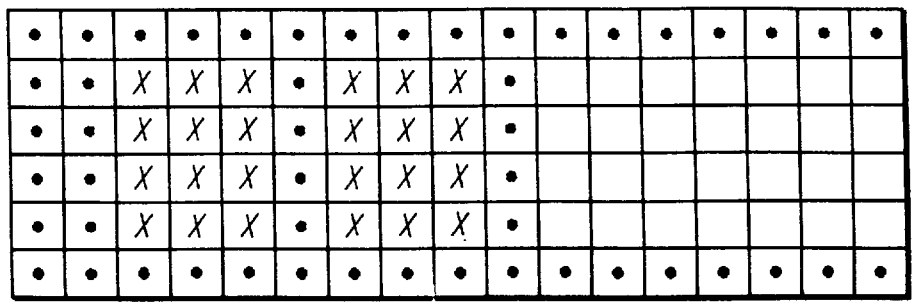
Figure 16A:
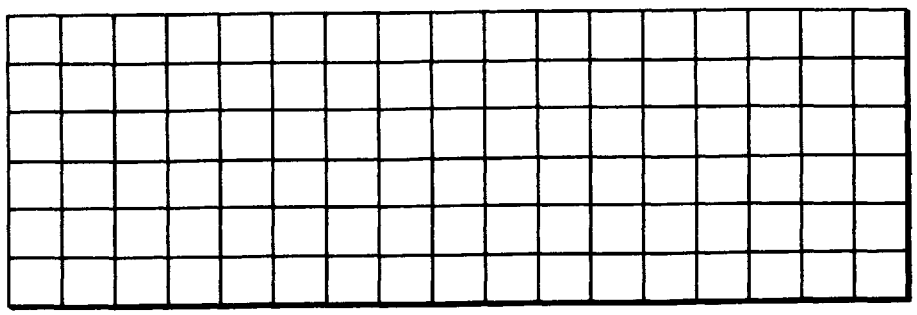
FIGS. 16a–16d illustrate counterparts to FIGS. 11a–11d for cross-section 6.
Figure 16B:
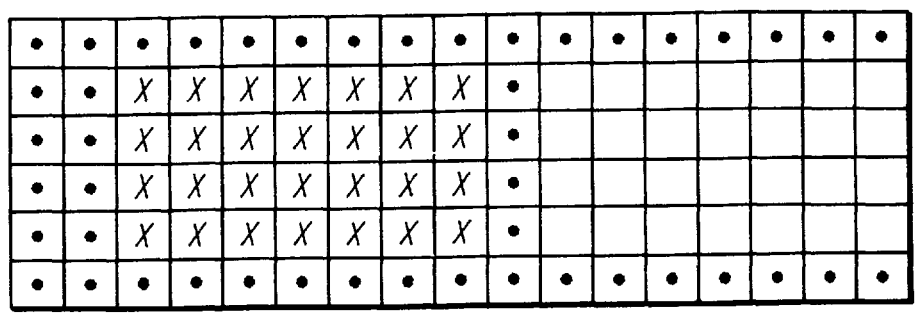
Figure 16C:
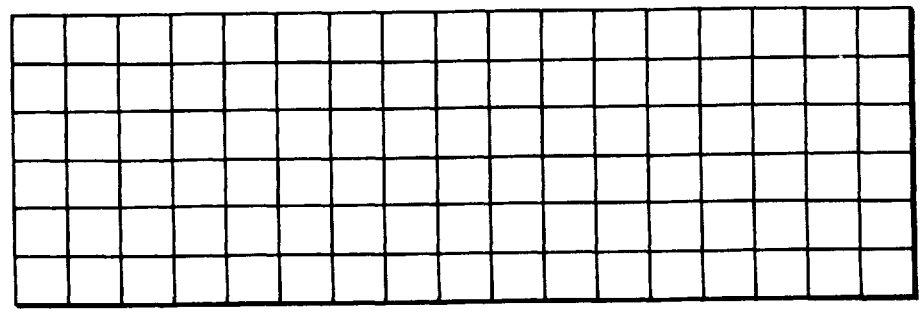
Figure 16D:
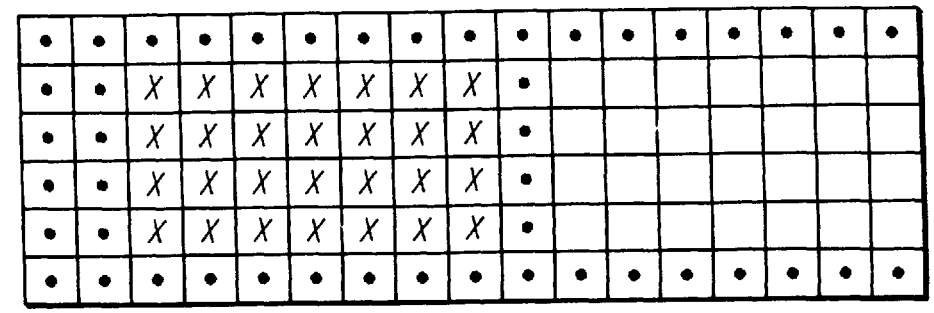

Finally in FIG. 10f, numeral 138 denotes an up-facing boundary surrounding a non-up-facing region, and numeral 140 denotes an up-facing boundary surrounding an up-facing region.

Figures 11A, 11B, 11C, 11D:
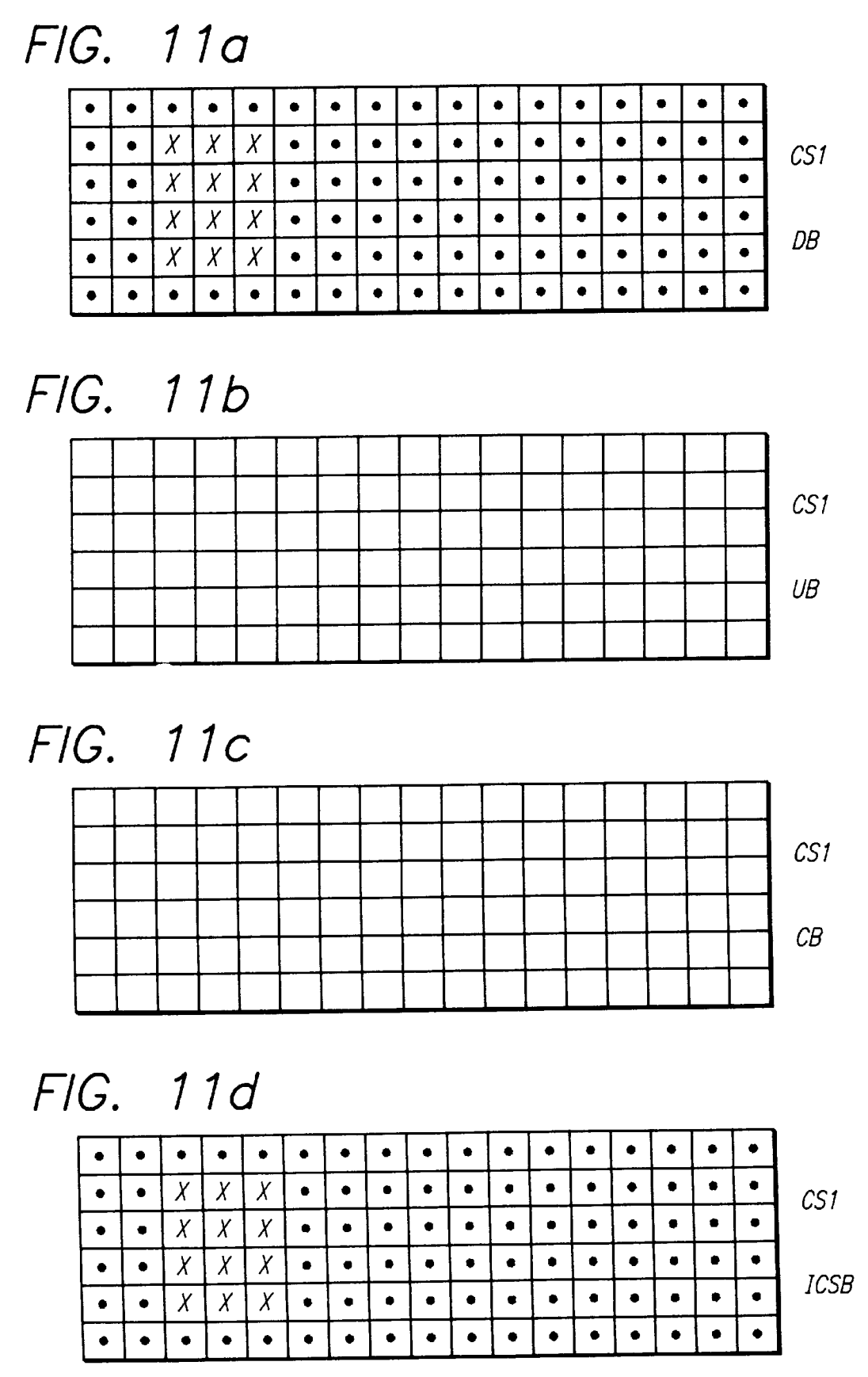

FIGS. 11a–16d illustrate top views of the regions defined by the down-facing boundaries, the up-facing boundaries, the continuing boundaries and the initial cross-section boundaries for cross sections 1 through 6 in a bitmap form, wherein each cell or pixel has a size that represents a desired resolution for the analysis (e.g. for example 0.025 mm to 10 mm). As described above, DBs, UBs, CBs, and ICSBs are available from the CSlice program. The regions forming part of the object within each boundary type are denoted with "dots," while the regions exclusive of the boundary type but within a hole in each boundary type are denoted with "Xs". For example, FIGS. 11a–11d show pixel-by-pixel area representations for each boundary representation associated with CS1. In particular, FIG. 11a shows regions defined by DBs (down-facing boundaries); FIG. 11b shows regions defined by UBs (up-facing boundaries); Fig. 11c shows regions defined by CBs (continuing boundaries); and FIG. 11d shows regions defined by ICSBs (initial cross-section boundaries). Similarly, FIGS. 12a, 13a, 14a, 15a, and 16a show regions defined by DBs for CS2, CS3, CS4, CS5, and CS6, respectively; FIGS. 12b, 13b, 14b, 15b and 16b show regions defined by UBs for CS2, CS3, CS4, CS5, and CS6, respectively; FIGS. 12c, 13c, 14c, 15c, and 16c show regions defined by CBs for CS2, CS3, CS4, CS5, and CS6, respectively; and FIGS. 12d, 13d, 14d, 15d, 16d show regions defined by ICSBs for CS2, CS3, CS4, CS5, and CS6, respectively. The ICSBs can be understood as being the Boolean union of DBs, UBs, and CBs. In looking at the ICSBs in this way, if an element (or pixel) defined by "dots" is overlapped with another element defined by "Xs", as in FIGS. 13b and 13c, the corresponding "Xs" in FIG. 13c are dominated by the dots due to the nature of the Boolean union operation. In other words, the positive area defined by "dots" in the UB region of CS3 (FIG. 13b) overrides the negative area defined by "Xs" in the CB region of CS3 (FIG. 13c) to form $ICSB_3$ shown in FIG. 13d for CS3.

In addition to the above, the CSlice program may provide the IUB data. As noted above, the IUB is different from UB in that IUB includes any areas which are up-facing as well as both up-facing and down-facing, whereas the UB includes those areas which are only up-facing.

Once the necessary boundary data (e.g. ICSBs, DBs, IUBs, and CBs) are available from the CSlice program or the like is derived or supplied in some other manner, the detection process for any trapped volume is performed as follows. With regard to CS1, any trapped volume for layer N−1 is initially imaged onto a first bitmap 170 for layer N and is denoted as $ITV_N$, as shown in FIG. 17a. For CS1, since there is no other layer beneath the first layer, the first bitmap 170 representing $ITV_N$ is filled with, for example, zeros. In the first embodiment of the present invention, the above described process may be implemented by using two bitmaps, namely first bitmap 170 and second bitmap 180.

The next operation which is illustrated in FIG. 17b entails the Boolean unioning of the $ITV_N$ with the $IUB_{N-1}$ to yield the potential trapped volume region $PTV_N$ which is saved into the first bitmap 170. Because both regions are empty, there is no potential trapped volume for CS1.

FIG. 17c illustrates the $ICSBH_N$. The ICSBH is obtained from ICSB and placed in bitmap 180 (see, for example, Fig.11d). In particular, the regions which are denoted with "Xs" in FIG. 11d are the holes which are shown in FIG. 17c as "1s".

The ICSBHs for each cross-section are individually flagged so that each ICSBH region may individually be analyzed to determine whether or not it forms part of a trapped volume. In performing this analysis each pixel of an ICSBH$_1$ region held in bitmap 180 is compared to the pixels in the bit map 170 containing PTV$_1$. If sufficient overlaps exists between the pixels in an individual ICSBH$_1$ region and pixels included in the PTV$_1$ regions, then the entire individual ICSBH$_1$ region is defined as a trapped volume for cross-section CS1 (TV$_1$) and remains in the second bitmap 180. Individual ICSBH regions that do not have sufficient overlap are removed, in their entirety, from the second bitmap 180. This process is continued until each ICSBH$_1$ is analyzed. Once the analysis is complete, the second bitmap contains only identified trapped volumes for the cross-section. The comparison of two sets of pixels is equivalent to a Boolean "AND" or intersection operation. In this example, since PTV$_1$ is null, there is no trapped volume for CS1, i.e., TV$_1$ is all zeros and FIG. 17d shows the bitmap 180 as empty.

The above steps are repeated for subsequent layers CS2 through CS6 to obtain trapped volume identifications for successive layers. This is illustrated in FIGS. 18a–22d. For each cross-section CSN, it is preferred that the second bitmap 180 for CS[N−1] becomes the first bitmap 170 for CSN and the first map 170 from CS[N−1] is cleared and becomes the second bit map 180 for CSN. This process of flipping the bit map identifications is advantageous since the final information stored in bitmap 180 for CS[N−1] is the information initially needed for bitmap 170 for CS[N]. The TV$_N$ for the current lamina becomes the ITV$_N$ for the next.

Once the algorithm detects a trapped volume 182, as shown in FIG. 19d for CS3, a link list may be created to keep track of the trapped volume areas in the entire bitmap. The information in the link list may be provided to a coating processor or a blade controller to effectively and automatically set the recoating style to be used over each trapped volume area located in various regions of a layer. Alternatively, the trapped volumes existing on a given layer may be analyzed to set a single desired recoating style for the entire layer. In the link list, each potential trapped volume area may be assigned attributes related to that area. For example, the link list for the trapped volume 182 may contain some or all of the originating polylist, area information, size/dimension information, etc., for each trapped volume region.

To determine the TV$_N$ in the first embodiment, each element (or pixel) of each hole in ICSBH$_N$ is matched with those of the PTV$_N$. Alternatively, for each hole that has more than a set percentage of area elements matched to area elements included in the PTV$_N$, the entire hole may be defined as a trapped volume (TV$_N$). An example of this type of thresholding is illustrated in FIGS. 22b–22d. In FIG. 22d, the region where there is an identical match of pixels in both PTV$_N$ and a single hole in the ICSBH$_N$ is marked with "1"s."" However, the individual hole which is being compared to the PTV$_N$ contains additional area not found in the PTV$_N$. This additional area is indicated by the pixels containing the "1+"s. If the percentage of the hole containing "1"s versus "1+"s is high enough, then the entire hole will be considered a trapped volume. This may be expressed in the form of the following logic equation which yields a true or false result, $$N1*100\%/(N1+N2) >= VT,$$

where N1 is the number of pixels of overlap, N2 is the number of pixels in the hole that do not have counterpart pixels in the PTV$_N$, and VT is the threshold percentage selected. It is anticipated that optimal threshold values, in actual practice, may be greater than 80–90%. In any event, it is within the level of skill in the art to perform experiments by building different objects and observing the effects of different levels of overlap/non-overlap so as to determine reasonable empirical values to be utilized as threshold values. If the equation produces a "true" result, then the hole is defined as a trapped volume. On the other hand if a "false" result is produced, then no part of the hole is defined as a trapped volume. For example, a thresholding value of 50% could be specified by an operator or as the result of a preset parameter. The determination of the thresholding value may be dependent upon various properties of fluid material. These properties might include viscosity and surface energy. In FIGS. 22b and 22c, the size of the potential trapped volume 184 with respect to the hole 186 in FIG. 22c is approximately 57% (16 pixels / 28 pixels). Because the PTV region 184 is more than 50%, the entire hole 186 is flagged as a trapped volume for CS6, as shown in FIG. 22d. Consequently, a link list may be updated to flag this region as a trapped volume. On the other hand if the threshold value (VT) was set at 60% or higher, then the entire hole would have not been identified as a trapped volume.

The determination of whether or not a potential trapped-volume region should become an identified trapped-volume region may take into consideration more than just the percentage overlap as proposed above. Such consideration may take into account such things as the cross-sectional size, cross-sectional width (in a sweeping direction), changes in cross-sectional size and/or width from layer to layer, vertical depth of the region, size and/or shape of the draining holes, viscosity of resin in the vat, surface energies of the solidified material and liquid material, etc. In fact, based on these factors it may be desirous to identify different types of trapped volumes (e.g. according to their depth or width) so that recoating styles may be even finely adjusted.

Examples of other thresholding techniques for other embodiments might include the use of one or more of the following techniques: (1) a varying percentage based thresholding value based on a determination of the net area of the hole on the present cross-section, e.g. as the area of the cross-section goes up through specified ranges, the threshold value may increase; (2) utilization of a minimum area of non-overlap in order to conclude that a sufficient flow path exists so that a trapped volume need not be declared; (3) utilization of a minimize critical circle for a non-overlapping set of pixels so as to conclude that a sufficiently large flow path exists; (4) a summing technique that includes the area or number of non-overlapping pixels from previous cross-sections as well as the present cross-section in order to determine that the net flow path is sufficiently large to obviate a trapped volume identification; (5) a weighted summing technique that looks at each individual non-overlapping region and associates a flow related value to that region based on its size and then sums all the non-overlapping regions wherein each one is weighted by its flow value so as to obtain a net flow value for the combined non-overlapping regions and compares that to a desired threshold value; (6) a technique that identifies continuing trapped volumes from layer-to-layer and sums the layer-by-layer area and thickness to obtain a net volume of each trapped volume and selects a threshold value and comparison technique based on the determined net volume to thereby ensure a better connection between the threshold amount, the flow paths available, and the potential amount of medium that must be transferred; (7) a technique that identifies trapped volumes that continue from layer to layer and identifies the net amount of non-overlap (either weighted for flow or not) for the trapped volume as a whole and compares this combined amount to a threshold value; or (8) a combination of the above noted techniques. Any of a variety of other techniques may be used especially those that can estimate whether or not sufficient flow is likely to exist so as to obviate identifying a particular hole as a trapped volume.

Various other modifications of the above embodiment can be made while yielding the same or at least reasonable results. Different Boolean operations can be used in place of those indicated along with utilization of different input data. For example instead of performing the union operation $ITV_N + IUB_{N-1}$ in step b, one could have performed the union operation $ITV_N + UB_{N-1} + DB_{N-1}$. Alternatively, instead of extracting the holes in the ICSBs, as done in step d, the holes may be extracted from the Boolean unioned combination of the $UB_N + DB_N + CB_N$.

The Second Embodiment

In a second embodiment of the present invention, a partial detection of trapped volume regions may be realized. The second embodiment may be used in an application where speed of data processing somewhat overrides the absolute detection of all of the trapped volume regions. For example, it may not be necessary to absolutely detect the first layer of a trapped volume since, serious trapped volume effects may not start until one gets somewhat higher into the trapped volume (e.g. 0.2 mm–1 mm). Similarly, it may not be necessary to absolutely detect the last layer of a trapped volume since in actual practice one may want to implement a trapped volume extension technique anyway. Further, depending on how the trapped volume information is to be used, it may not be necessary to detect the full area or width of a trapped volume since, for example, one may be strictly interested in a gross determination of whether or not a trapped volume exists on a given lamina and not exactly where it is located or how large it is.

The steps for partially detecting closed trapped volume regions are similar to the full detection algorithm except that step b now unions $ITV_N$ with $UB_N$, instead of $IUB_N$ (hereinafter "step b"). All other steps described with regard to the first embodiment remain the same for the second embodiment. As a result, the second embodiment uses regions that are only up-facing, as defined by the final up-facing boundaries (UBs), as a trigger for finding any trapped volume region, whereas the first embodiment uses regions which are up-facing only and which are also both up-facing and down-facing (IUB). Consequently, the first embodiment can detect a trapped volume which is located above a solid region that is formed by solidifying a region according to a single cross-section of data (i.e. a region that is only one layer thick). Alternatively, the second embodiment of the present invention can only detect a trapped volume if it is located above a region that includes at least two cross-sections of data (e.g. a region that is at least two layers thick). However, since most objects stereolithographically formed have minimum thicknesses greater than 1 layer thickness (which is typically 4–6 mils), the second embodiment can produce substantially the same result as that of the first embodiment. The likelihood of misidentifying regions increases with the second embodiment as objects are to be formed according to the Simultaneous Multiple Layer Curing (SMLC) Techniques as described in U.S. Pat. No. 5,597,520 and U.S. Pat. application Ser. No. 08/428,951 both by Smalley, et al. (which are both hereby incorporated by reference as if set forth in full herein). As such, it may be advisable to identify trapped volumes according to initial cross-sectional data or three-dimensional object data prior to the data being manipulated for SMLC formation.

The second embodiment, as described above, preferably uses the UB data from the CSlice program or the like. Thus, the IUB data used in the first embodiment need not be made available for the trapped volume detection technique thereby reducing the amount of data needing to be handled and/or level of data manipulation needing to be performed after detecting the trapped volumes.

Vertical Extensions of Trapped Volumes: Embodiments 3 and 4

In some circumstances, the usefulness of the embodiments described above can be enhanced by appropriate vertical extensions of trapped volumes beyond their upper most ending layers. As noted above, such extensions of trapped volumes are appropriate when thin vertical flow paths (0.1 mm to 1 or 2 mm or more) hinder the flow of unsolidified material to such an extent that surface level equalization does not quickly occur between two nearly separated regions of unsolidified material. The vertical extension of trapped volume regions may be based on either of the first two embodiments, any of their alternatives or the like.

The vertical continuation or vertical extension of trapped volumes may occur in at least two ways. First, the definition of each trapped volume region for its ending lamina may be extended one or more layers above its vertical level. This embodiment is simple to implement and is adequately effective for many object geometries. However, this approach may fail to adequately predict trapped volume behavior especially in the situation where a one or more layer thickness opening may exist on the side of the trapped volume (also known as a breach). This breach, which dictates the end of a trapped volume, may not effectively eliminate the trapped volume on higher layers; especially if it closes after a few layers. This breach may be too small an opening to effectively allow material to flow into or out of the region. According to the first two embodiments once a trapped volume is detected as being completed, it cannot later be identified as a trapped volume until an up-facing region is found on a subsequent layer that borders the region from below.

The second technique involves continuing the trapped volume for one or more layers. If within the specified number of layers the opening closes, and the holes in the ICSBs are thereby reformed, the process will continue to appropriately identify the region as an effective trapped volume. The most effective application of this technique probably involves the use of at least one additional bitmap for each extension layer being used.

A technique embodiment 3) for identifying effective trapped volumes associated with each lamina is discussed below. This technique is based on vertically extending trapped volumes which were completed on a previous lamina but whose influence might extend to the present lamina. The extension of influence might occur in two ways: (1) the completed trapped volume is in proximity to the present lamina (within M layers) (hereinafter "Type 1 extension"), or (2) the completed trapped volume is removed some distance from the present lamina (more than M layers away), but its Type 1 extended nature was taken into consideration and it was reconstituted within R layers of the present lamina (hereinafter "Type 2 extension"). It is believed that in certain circumstances it might be advantageous to have R<=M; however, it will be assumed that R=M. Modifications can be made to the embodiments below to accommodate different values of R and M. In fact it is possible to not use a set value of M or R but instead to estimate flow rate details and required extension amounts based on object geometry.

Figure 23F:
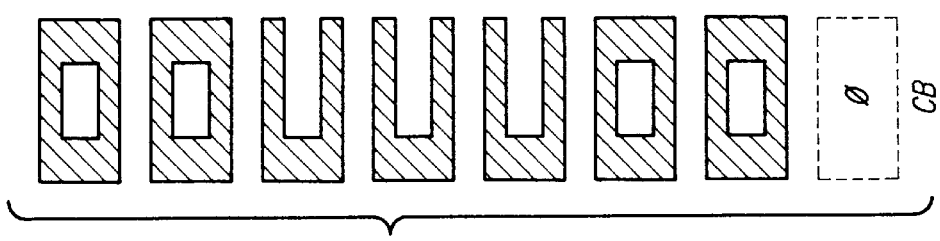
FIGS. 23a–23f illustrate an exploded view of laminae making up a three-dimensional object and various boundary representations for each lamina.
Figure 23E:
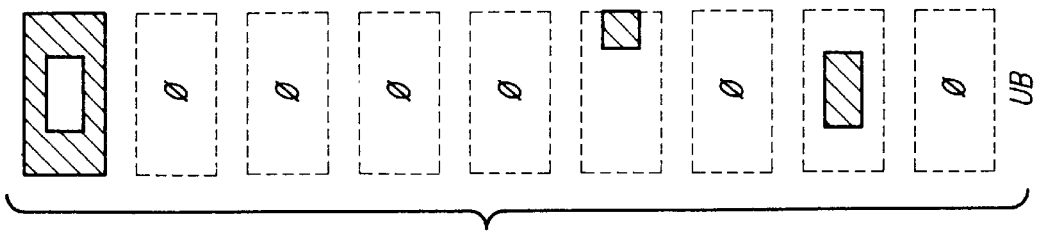
Figure 23D:
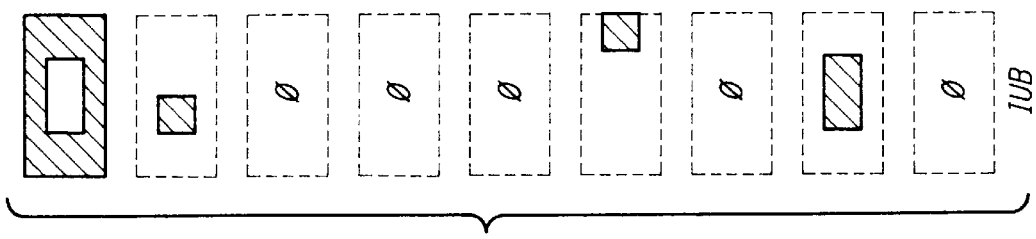
Figure 23C:
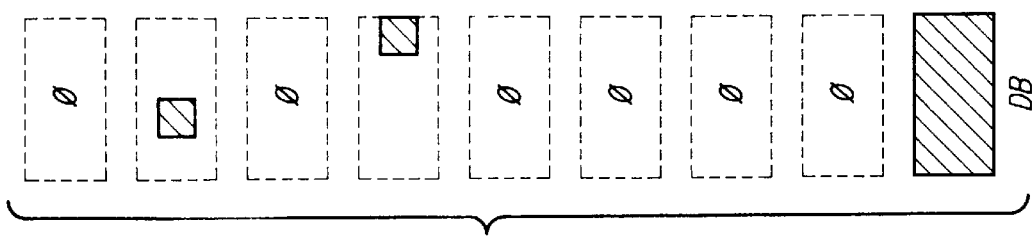
Figure 23B:
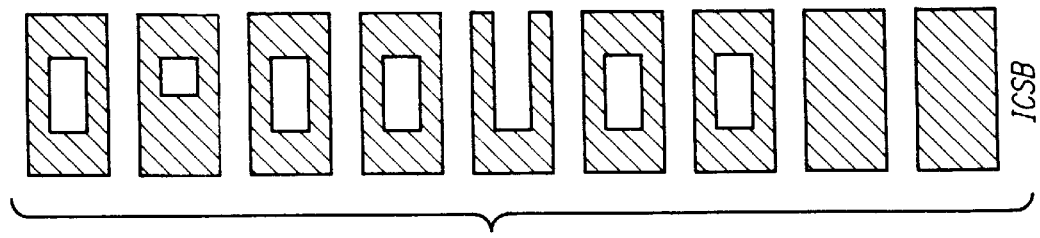
Figure 23A:
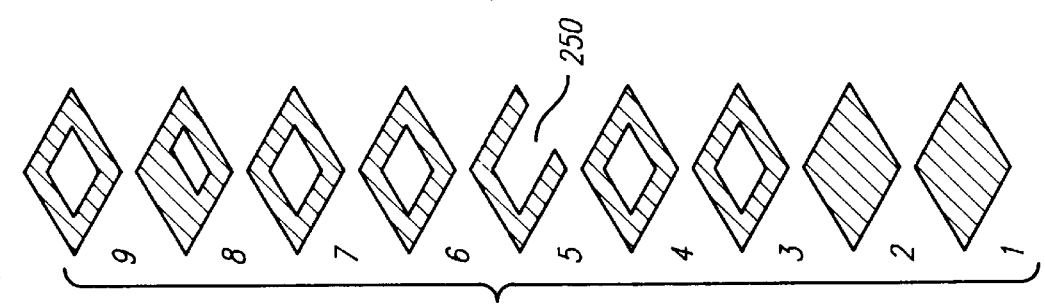

An example of an object containing what is preferably treated as a Type 2 extension is depicted in FIG. 23a. FIG.

23a depicts an exploded isometric view of nine laminae (1–9) making up a three-dimensional object. The first two lamina are solid rectangular plates. Laminae 3 and 4 are ring-like structures. The combination of laminae 2 and 3 form a trapped volume on lamina 3. Lamina 4 continues the trapped volume. Lamina 5 is a "U" shaped structure that contains a horizontal breach 250 adjacent to the area included in the trapped volume of lamina 4. The breach 250 results in the completion of the trapped volume on lamina 4. However if we assume that M>=1, then an effective trapped volume still exists on lamina 5. This effective trapped volume must be considered in setting optimum recoating parameters over lamina 5. Laminae 6 and 7 are ring-like structures identical to laminae 3 and 4. As lamina 5 includes an effective trapped volume, and as lamina 6 completely encloses the area forming the effective trapped volume on lamina 5, lamina 6 reforms or reconstitutes the trapped volume. Lamina 7, based on its ring like structure and registration with Lamina 6, also continues the trapped volume. Lamina 8 also represents a ring-like structure though it has a smaller hole than laminae 6 and 7. Based on the registration of holes between lamina 7 and 8, lamina 8 continues the trapped volume. Lamina 9 is identical to lamina 7 and based on its registration with lamina 8, it continues the trapped volume. If additional laminae were to be formed above lamina 9 but which did not continue the trapped volume, then it might be desirable to have the M laminae immediately above lamina 9 be identified as trapped volumes by identification as Type 1 extended trapped volumes.

As noted above, the first embodiment for detecting trapped volumes involved the steps of:

(1) Defining potential trapped volumes for lamina N, $PTV_N$, (to be used in coating over lamina N for forming a coating in preparation for forming lamina N+1) as the boolean union of area elements, as defined by pixels, RLE data and/or by boundary regions, or the like, $$PTV_N = TV_N + IUB_{N-1}$$

(2) Comparing these PTVs to the holes that exist in the ICSBs of lamina N (the $ICSBH_N$). This comparison process includes making a hole-by-hole comparison between the $ICSBH_N$ and the $PTV_N$. Holes which meet a predefined relationship with the $PTV_N$ will be defined as trapped volumes. For example, holes that have a high enough percentage of their area elements overlapped with regions of the $PTV_N$ will be labeled as trapped volumes, $TV_N$.

FIGS. 25a–25d depict an application of the first embodiment to each lamina of object of FIG. 23a. FIG. 25a depicts Initial Trapped Volume Regions for each lamina, $ITV_N$. The $ITV_N$ are equivalent to the $TV_{N-1}$ of step 1 above. FIG. 25b depicts the $PTV_N$ for each lamina. FIG. 25c depicts the $ICSBH_N$ for each lamina. FIG. 25d depicts the $TV_N$ for each lamina as derived according to step 2 above. Instead of depicting the actual $TV_N$ for lamina 9, FIG. 25d shows a question mark. Since the hole for lamina 9 of FIG. 25c does not have all of its area elements matched by area elements with the $PTV_N$ for lamina 9 in FIG. 25b, the question of whether or not lamina 9 includes a trapped volume depends on the selection criteria utilized in comparing holes with potential trapped volume regions. FIGS. 25e and 25f depict first and second alternative outcomes for $TV_9$ (the $TV_N$ on lamina 9). As noted previously, the TV may be based on percentage overlap. In the instant case, it is assumed that the $ICSBH_N$ has about twice the area of the $PTV_N$. Therefore, if the selection criteria defines a trapped volume to have at least 50% overlap, then the result in FIG. 25e is achieved. If on the other hand, the selection criteria defines a trapped volume as requiring something more than 50% overlap (e.g. 80%, 90% or 95% overlap), then the result in FIG. 25f is achieved.

The Third Embodiment

The third embodiment takes into consideration both the Type 1 and Type 2 extensions. As stated above, the Type 1 extension identification process considers the immediately preceding M−1 laminae (i.e., M layer thicknesses when the thickness of the present layer is considered) when deriving an extension, while the Type 2 extension identification process considers the immediately preceding R−1 laminae (i.e., R layers when the thickness of the present layer is considered). In the present embodiment, it is assumed that R=M. Modifications can be made to the algorithm so as to allow R to be different from M and most preferably to allow R<=M.

The third embodiment may be implemented according to steps that are discussed below. These steps might be incorporated into a software or hardware architecture as part of a stereolithographic apparatus or as part of an apparatus for generating data for subsequent use by a stereolithographic apparatus. The algorithm may be implemented so as to generate trapped volume data for all laminae prior to beginning object formation or the trapped volume data may be generated as needed during the building process.

It is desired that two varieties of trapped volumes be associated with each layer N: (1) trapped volumes derived from holes existing on layer N (hereinafter "Variety 1 trapped volume"); and (2) trapped volumes which have been extended from lower layers (hereinafter "Variety 2 trapped volume"). Thus the Net Trapped Volume (NTV) associated with lamina N may be defined as, $$NTV_N = TVH_N + NETV_N$$

where the variable $NTV_N$ is a mnemonic for "Net Trapped Volumes for lamina N". $TVH_N$ is the Variety 1 trapped volumes as discussed above. $TVH_N$ is a mnemonic derived from "Trapped Volumes derived from Holes in lamina N". $NETV_N$ is the Variety 2 trapped volumes as described above. $NETV_N$ is a mnemonic derived from "Net Extended Trapped Volumes for lamina N".

The $TVH_N$ s in the above equation are derived (from $PTVH_N$s) in an analogous manner as used for deriving the $TV_N$s (from $PTV_N$s) associated with the first embodiment with the exceptions that the $TV_{N-1}$s are replaced by the $NTV_{N-1}$s and $PTV_N$s are replaced by the $PTVH_N$s. The $PTVH_N$s may be in turn derived by from, $$PTVH_N = NTV_{N-1} + IUB_N,$$

where $IUB_N$ is a mnemonic for "Intermediate Up-Facing Boundaries".

The $TVH_N$s may then be derived from the holes in the $ICSB_N$s that are sufficiently overlapped by the $PTVH_N$s in a manner analogous to that described above in deriving the $TV_N$s from the $PTV_N$s.

The $NETV_N$ can be derived from the individual Extended Trapped Volumes (ETVs) associated with the M laminae preceding lamina N, $$NETV_N = ETV_N +$$
$$ETV_{N-1} - DB_N +$$
$$ETV_{N-2} - DB_{N-1} - DB_N +$$
$$\ldots$$
$$ETV_{N-M+1} - DB_{N-M+2} - \ldots - DB_{N-2} - DB_{N-1} - DB_N,$$

where $DB_N$ is a mnemonic for Down-Facing Boundaries, and where the ETVs can be derived from, $$ETV_N = TVH_{N-1} - TVH_N - DB_N.$$

In alternative embodiments, it may be desired to simplify the calculations by ignoring the $DB_N$s.

In the above equations, the "+" and "−" operations refer to Boolean union and differencing operations as applied to area elements. These area elements may be specified in a boundary format, a bit map format, an RLE format or any other format appropriate for conveying and manipulating area information. The data flow for the present embodiment might proceed according to the following steps:

(1) Start with the ICSB, IUB, and DB for each lamina (i.e. have available $ICSB_N$, $IUB_N$ and $DB_N$)

(2) For each lamina beginning with N=1, derive the following (Note when N=1, N−1=0 and all variables associated with N=0 are null):

(a) Derive the potential trapped volume areas for lamina N from $$PTVH_N = NTV_{N-1} + IUB_N.$$

(b) Find the holes, $ICSBH_N$, on $ICSB_N$.

(c) Compare the holes, one by one to the $PTVH_N$. Identify holes having sufficient overlap with the $PTVH_N$ as $TVH_N$.

(d) Derive $ETV_N$ from, $$ETV_N = TVH_{N-1} - TVH_N - DB_N.$$

(e) Derive the $NETV_N$ from, $$NETV_N = ETV_N +$$
$$ETV_{N-1} - DB_N +$$
$$ETV_{N-2} - DB_{N-1} - DB_N +$$
$$\ldots$$
$$ETV_{N-M+1} - DB_{N-M+2} - \ldots - DB_{N-2} - DB_{N-1} - DB_N,$$

(f) Derive the $NTV_N$ from $$NTV_N = TVH_N + NETV_N.$$

(g) Replace N by N+1 in the above equations and repeat steps (2)(a) through (2)(f) for the next lamina.

(3) Use the $NTV_N$ for setting appropriate recoating styles (i.e. recoating techniques and/or recoating parameters for optimizing the coating formation over lamina N).

A full implementation of the above embodiment requires either recalculation of some variables on each layer or requires that the variable values be saved in memory elements. In addition to the two memory arrays (e.g. bit maps) utilized by the embodiment shown in FIGS. 25a–25f, the present embodiment can benefit from the use of an additional 2*M memory arrays. These additional memory arrays are used to store the "M" ETVs and "M"DBs which are associated with the instant lamina (i.e. lamina N) and the M−1 laminae preceding the instant lamina being processed. These additional memories can be relabeled by shifting their numerical identifiers by −1 as the next higher lamina takes on the value N. The memory containing the $ETV_{N-M+1}$ and $DB_{N-M+1}$ when processing the previous lamina is cleared so that it is available to hold the data for the newly defined lamina N.

Application of the above embodiment to the object of FIG. 23a is depicted in FIGS. 24a–24f with the aid of FIGS. 23b–23f. FIGS. 23b, 23c, 23d, 23e, and 23f depict for each lamina, the ICSB, DB, IUB, UB, and CB cross-sectional regions, respectively. These regions are described in the previously referenced CSlice Patent (U.S. Pat. No. 5,321, 622).

FIG. 24a depicts the $PTVH_N$ for each lamina as dictated by step 2a. FIG. 24b depicts the holes, $ICSBH_N$, within the ICSB for each lamina of FIG. 23b as dictated by step 2b. FIG. 24c depicts the $TVH_N$ for each lamina as dictated by step 2c. FIG. 24d depicts the $ETV_N$ for each lamina as dictated by step 2d. FIG. 24e depicts the $NETV_N$, assuming M=2, for each lamina as dictated by step 2e. FIG. 24f depicts the $NTV_N$ for each lamina as dictated by step 2f. A lamina-by-lamina comparison of the $TV_N$ of FIG. 25d to the $NTV_N$ of FIG. 24f, illustrates a more complete trapped volume identification is obtained from the instant embodiment than from the first embodiment.

The Fourth Embodiment

A fourth embodiment for vertically extending identified trapped volumes is discussed below. This alternative embodiment does not focus on when individual trapped volumes are completed, but instead focuses on which laminae represent transitions from having one or more trapped volumes to having no trapped volumes. This embodiment concerns itself with identifying the laminae which do not contain any trapped volumes and are located immediately above lamina containing one or more trapped volumes. These initial non-trapped volume laminae represent the first of the M laminae, or object layers, into which the trapped volumes will be extended for at least the purpose of defining optimal recoating parameters to be utilized in forming coatings over these laminae.

Figure 27:
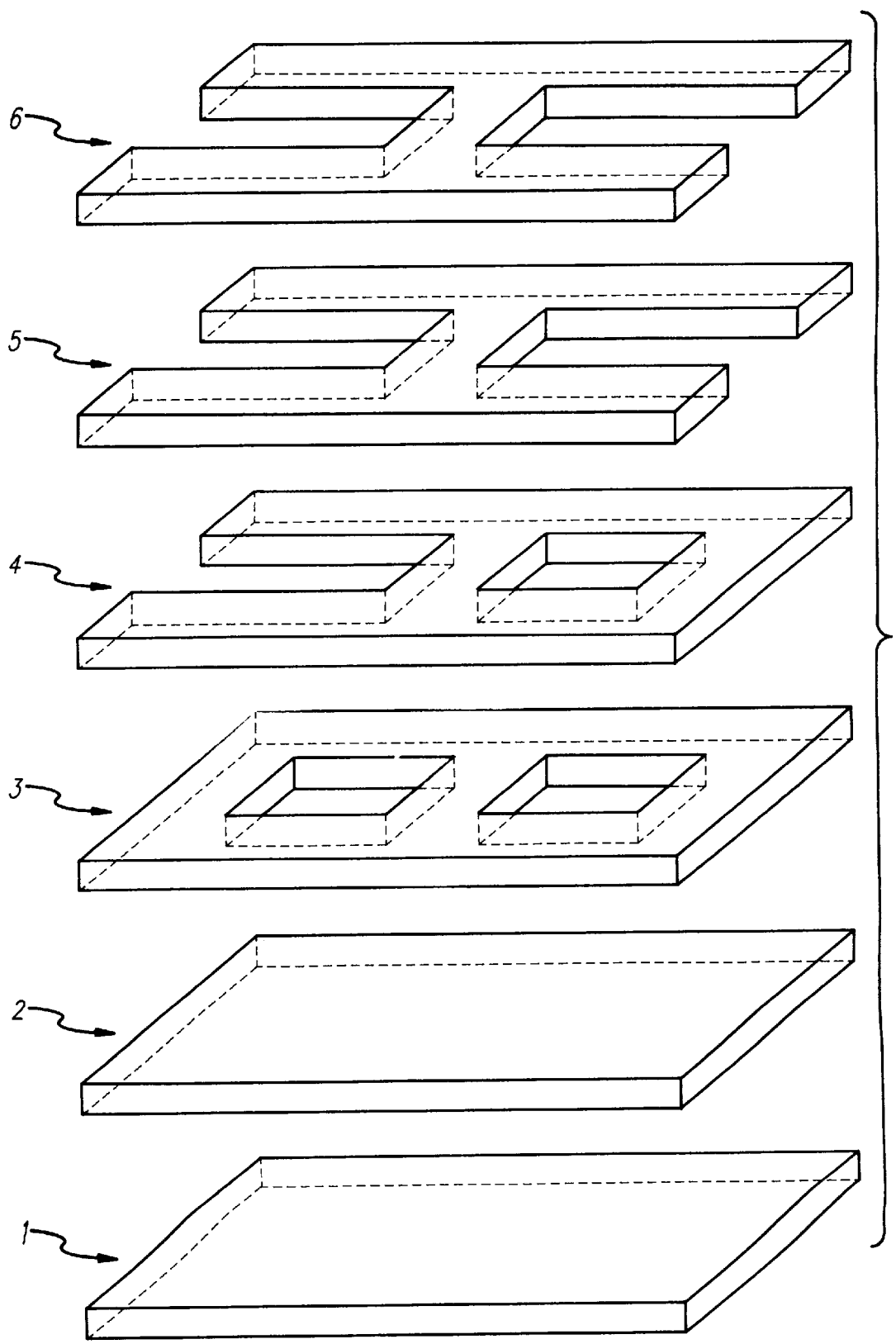
FIG. 27 illustrates an object having six laminae for purposes of explaining extension of trapped volumes.

An example of how this embodiment might be applied to a given object geometry is illustrated in FIG. 27. FIG. 27 depicts an object having six laminae (1–6), each lamina is defined by data derived from a cross-section of the object, and each lamina is formed by selective solidification of a layer of medium. Lamina 1 through lamina 6 are indicated with reference numerals 1 to 6 respectively.

As depicted in FIG. 27, laminae 1 and 2 are in the shape of solid slabs. Lamina 3 on the other hand is in the form of a solid border region surrounding a hole on the left and a hole on the right of the part. The material solidified on lamina 3 in combination with that solidified on Lamina 2 traps liquid material within the left and the right holes, thus forming left and right trapped volumes. The recoating parameters and techniques used in forming a coating of material over lamina 3 in preparation for forming lamina 4 should be appropriate for handling both trapped volumes.

Lamina 4 is in the shape of a solid border region bounding a right hole and solid arms forming a left-side, hollow indentation (i.e. a left-facing fork of solidified material). A combination of the material solidified on lamina 4 and the trapped volume regions identified on lamina 3 result in a trapped volume on the right side of the object. Since the left-side trapped volume identified on lamina 3, does not continue through lamina 4, this left side trapped volume was completed on lamina 3. Since the left-side trapped volume was completed on lamina 3, the question arises as to whether or not this trapped volume should be extended to lamina 4 for at least the purpose of defining parameters/techniques in recoating over lamina 4. According to this embodiment, no extension is necessary since a trapped volume already exists on lamina 4 thus dictating that trapped volume parameters be used in recoating over lamina 4. According to this embodiment, the completion of the left-side trapped volume would not be recognized, since the embodiment is only concerned with the question of when transitions occur from a lamina with one or more trapped volumes to a lamina with no trapped volumes.

Of course other embodiments are possible where the completion of individual trapped volumes will be noted thereby allowing for individual area extensions and possibly the use of different recoating parameters or techniques over different portions of each lamina.

Lamina 5 has a shape including solid arms forming left and right indentations, or left- and right-facing forks. Due to the failure of lamina 5 to generate any new trapped volumes or to form a complete loop over the right side trapped volume region identified on lamina 4, no trapped volumes exist on lamina 5. Since lamina 4 contained at least one trapped volume and since lamina 5 contains no trapped volumes, lamina 5 is identified as the first of M consecutive lamina that will be labeled as including an extended trapped volume, thereby allowing recoating parameters to be appropriately selected.

Lamina 6 has an identical configuration to lamina 5. No trapped volumes exist on lamina 6 and the last real trapped volume was found on the second lamina below (i.e., lamina 4). Thus if M=1, then lamina 6 would not be identified as containing an extended trapped volume. On the other hand if M>=2 then lamina 6 would be identified as containing an extended trapped volume and recoating over lamina 6 would be handled accordingly.

This embodiment may be used to derive extensions for the trapped volumes as identified according to the first or second embodiments discussed above. This embodiment may be implemented by applying the following steps as applied to each laminae:

(1) Start with $TV_N$ ($TV_N$ represents the data descriptive of the trapped volume found on lamina N). In addition to identifying the existence of one or more trapped volumes on lamina N, it may include various particulars about each trapped volume).

(2) Identify (as true or false) which laminae include trapped volumes:

$$TV_N' = \text{True if } TV_N \text{ exists},$$
$$= \text{False if } TV_N \text{ does not exist}$$

(This step reduces the information obtained from step (1) to a single true or false designation for each lamina).

(3) Identify (true or false) which laminae represent the first of M laminae to be labeled as including extended trapped volumes.

$$IETV_N = (TV_N' = \text{False}) * (TV_{N-1}' = \text{True}),$$

alternatively this relationship may be expressed as $$IETV_N = (TV_N')' * (TV_{N-1}'),$$

or as $$IETV_N = (TV_{N-1}')/(TV_N')$$

(Each of the above variables represents a single true or false value, —*—represents the Boolean "and" operation, —'—represents the boolean "not" operation (note: the —'—inside the parenthesis does not represent a Boolean operation but instead represents a variable designator), and —/—represents the Boolean inhibition operation.) This relationship may alternatively be expressed in terms of the following truth table:

|    | $IETV_N$ |    | $TV_N'$ | $TV_{N-1}'$ |
|----|----------|----|---------|-------------|
| is | True     | if | False   | True.       |
| is | False    | if | False   | False       |
| is | False    | if | True    | True        |
| is | False    | if | True    | False       |

(4) Identify (true or false) which laminae include extended trapped volumes:

$$ETV_N = (IETV_N) + (IETV_{N-1}) + \ldots + (IETV_{N-M+1})$$

(Each of the above variables represents a single true or false value and "+" represents the boolean "or" operation)

(5) Alternatively, define the existence (true or false) of net trapped volumes per each lamina according to step (a) below or the trapped volume attributes (details beyond true or false) according to step (b) below.

(a) Identify (true or false) whether or not a net trapped volume exists on each laminae:

$$NTV_N = TV_N' + ETV_N$$

(Each of the above variables represents a single true or false value and "+" represents the boolean "or" operation)

(b) Identify the attributes of each trapped volume making up the $NTV_N$, Attributes of $NTV_N = TV_N +$ HTV(I), where TV(I) is the trapped volume attributes of the highest lamina "I" between "N" and "N−M+1" containing a true $TV_N'$.

This embodiment, especially as implemented through step 5(a), has the advantage of being simple to implement and of fast operation due to the minimal number of computations involved.

The above embodiment may fail to recognize trapped volumes that reform in an extended trapped volume region due to reconstitution of holes above trapped volumes in that region (for example the effective reformation of the trapped volume by lamina 6 in FIG. 23a would not be recognized). The information produced is only useful for specifying a single recoating style for a given cross-section since the information about X and Y positioning of the extended trapped volumes is lost when step 5(a) is implemented. Even when step 5(b) is implemented, information about some extended trapped volumes may be lost since only information from the highest of the M lamina is utilized in defining the extended trapped volume region. If the M laminae contain completed trapped volumes from different lamina, then only the trapped volumes associated with the highest one of these would be recognized. An additional potential short coming with this embodiment involves its failure to recognize which of the two ways the trapped volumes are closed. If closed one way, the trapped volume has no extended effect. If closed the other way the trapped volume can have an extended effect for the next M layers. This embodiment may be more susceptible to flagging laminae as containing extended trapped volumes when they really do not.

The application of this embodiment as applied to the object of FIG. 23a is depicted in FIGS. 26a14 26e. FIG. 26a depicts the lamina-by-lamina result for $TV_N$ as dictated by step 2 (note: that the second alternative for $TV_9$ has been assumed). FIG. 26b depicts the lamina-by-lamina result for $IETV_N$ as dictated by step 3. FIG. 26c depicts the lamina-by-lamina result $ETV_N$ (note: it is assumed that M=2) as dictated by step 4. FIG. 26d depicts the lamina-by-lamina result for $NTV_N$ as dictated by step 5(a). FIG. 26e depicts the lamina-by-lamina results for the attributes of $NTV_N$ as dictated by step 5(b).

In the above embodiments of the present invention, the detection of trapped volumes in each layer of a three-dimensional object is based on the formation of complete loops of solidified material surrounding unsolidified material. In these previously described embodiments, incomplete loops of material could not contribute to the formation of a trapped volume (though a trapped volume might be identified on such a lamina due to an extension resulting from the lamina being within M layers of a trapped volume).

The Fifth Embodiment

In a fifth embodiment of the present invention, cross-sections containing breaches may contribute to the formation of trapped volumes. In this embodiment the width of an opening or breach in a lamina is considered so as to enable determination of whether or not the breach is small enough to act as a flow restricter such that a trapped volume effectively exists on the lamina. In other words, in this embodiment the width of such openings are analyzed and a conclusion drawn as to whether or not the openings form at least a minimum flow path necessary to conclude that the trapped volume does not effectively exist on the lamina. The present embodiment provides a technique for considering how horizontal flow restrictions can impact the existence of trapped volumes on a given lamina. This embodiment offers the additional advantage that small holes (which may be too small to act as a trapped volumes) in the original data may be removed prior to determining where trapped volumes are located.

This embodiment may be implemented according to the following steps, wherein the last step of the embodiment involves using the previously described embodiments, or the like, with modified input data to achieve trapped volume definitions that include dependence on the width of openings or breaches within individual laminae:

(1) Start with ICSB.
(2) For each lamina, derive modified $ICSB_N$ ("$MICSB_N$") according to the following steps:
  (a) Perform an inverse errosion operation on $ICSB_N$ to effectively expand the solid area of cross-section N. The amount of this expansion should be selected to be equal to a parameter W which represents a limiting width of a breach that a breach of narrower width will act as a flow restrictor while a breach of wider width will not act as a flow restrictor.
  (b) Find intersecting line elements that resulted from the expansion of the cross-section.
  (c) Break all intersecting elements at the points of intersection and assign the same orientation to each sub-element as that possessed by the original line elements.
  (d) Perform a union operation on the expanded cross-section to remove any overlapping regions which have resulted from the expansion.
  (e) Find individual boundary loops.
  (f) Perform an erosion routine on the boundary loops to effectively shrink the solid area defined by the cross-section. Define these boundaries as the $MICSB_N$.
(3) Use the $MICSB_N$ to define at least modified DBs, MDBs, and modified IUBs ("MIUB").
(4) Use the $MICSB_N$, $MDB_N$, and the $MIUB_N$ in place of the $ICSB_N$, $DB_N$, and the $IUB_N$ as specified in the earlier trapped volume detection embodiments, to derive trapped volume definitions for each lamina.

Additional Considerations

The above five embodiments and their alternatives and equivalents are directed to the automatic detection of actual and effective trapped volume regions. Trapped volume regions can be difficult to identify manually, especially with complex objects. The recoating styles used to recoat trapped volumes tend to be more time consuming than the recoating styles used to recoat over other geometric features and as such are not desirable to use unless necessary. The automatic detection of trapped volumes by the instant invention, in combination with empirically determined recoating styles (i.e. recoating parameters for a given recoating device) for those regions, can be used to automate the selection of recoating styles used in stereolithography. The recoating styles may be based on the mere existence of an identified trapped volume or alternatively they may be based on the trapped volumes for a given lamina meeting certain criteria as noted above. This automation greatly reduces the skill required to build accurate objects in effective time periods.

Another important geometric feature that may require special recoating parameters is large solidified regions. As such, automatic detection of these regions, as well as trapped volume regions, may be advantageous for optimal and automatic specification recoating styles.

Large solidified regions may result from large regions of solidified material on a single lamina or they may exist due to solidification of material on a series of laminae. A technique for automatically detecting large solidified regions on a single lamina may involve the following steps:

1) Start with the ICSB (N) region data or other region data that should be considered for recoating purposes. For example, if a build style is used that does not solidify all portions of the ICSB, it may be more appropriate to focus on the combined areas of the DB(N) and UB(N) as opposed to the area of the ICSB.
2) Erode the ICSB(N) region or other region according to a step size at least twice as small as the resolution desired in determining the width of the region.
3) Determine if any portion of the region remains after the erosion. If not, proceed to step (5). If so, proceed to step (4).
4) Repeat steps (2) and (3) counting the number of erosions made. If erosions of different sizes are made to most efficiently process the data, the step of each erosion must also be tracked.
5) Derive the maximum, width or critical circle, of the cross-section (i.e. the lamina) by multiplying the number of erosions made by the two times the step size per erosion.

As noted above, the effective cross-sectional width may be larger than the width of the cross-section N. The "effective width" may be based on the sum of the width of Lamina N and the widths of a number "S" of previous laminae. The appropriate number of previous laminae to include in the sum can be determined empirically. It is believed that the cross-sectional widths of the laminae located less than 0.5 to 2.0 mm, or more, below the working surface may impact the recoating process for laminae N. To account for the impact that previous cross-sections may have on the above process, step 1 may be replaced by step (1'):

1'. Start with the ICSB (N), ICSB(N−1), ..., ICSB(N−S) regions and union these regions together to define the Net ICSB(N), NICSB(N). Use the NICSB(N) in place of the ICSB(N) in the remaining steps of the process. Region data other than the NICSB(N) can be considered for recoating purposes. For example, if a build style is used that doesn't solidify all portions of the ICSB, it may be more appropriate to focus on the combined areas of the DB and UB for from cross-sections N-S to N.

The most effective, or at least reasonably efficient, recoating styles for different object geometries can be found empirically, by one of skill in the art, by building series of test parts having different geometric features and differing recoating styles. Observation and/or analysis of the effectiveness of the varying styles can be used to ascertain the most desirable recoating styles for use coating over differing geometric features. In fact, more than one recoating style might be associated with each feature depending on what trade offs are acceptable in building a particular object. In some situations object accuracy may far out weigh build time. In another situation the opposite might be true, while in a third situation balancing the two might be necessary. The empirically determined recoating styles can be placed in a look up with associated geometric features. Upon detection of a particular geometric feature or set of features on a given lamina, the look up table may be accessed by the SLA and an appropriate recoating style selected without user intervention. As SLAs typically have a single recoating device, the look up table might be specific to that recoating device and include parameter variation depending on the type of geometric features associated with a given lamina. The entries in the table might be ordered in a particular sequence such that geometric features requiring the most stringent recoating parameters are entered first followed by those features requiring less stringent parameters. For example, entries in the table might include one or more trapped volume definitions for which different recoating parameters are appropriate, one or more solid region definitions for which different recoating parameters are appropriate, and a standard feature entry for all those laminae that do not contain features requiring the more stringent recoating criteria. A sample table with some hypothetical parameters is illustrated below.

Sample Look Up Table of Recoating Parameters for use with a Vacuum Applicator

| Geometric Feature Found | Recoating Style - Option A (Optimize Object Accuracy) | Recoating Style - Option B (Minimize Build Time) |
|---|---|---|
| TV Width > $W_1$ | 5 sweeps 60 second delay | 3 sweeps 60 second delay |
| $W_2$< TV Width < $W_1$ | 3 sweeps 60 second delay | 3 sweeps 45 second delay |
| Solid Width > $W_3$ | 3 sweeps 45 second delay | 3 sweeps 30 second delay |
| TV Width < $W_2$ | 1 sweep 60 second delay | 1 sweep 45 second delay |
| $W_4$< SW < $W_3$ | 1 sweep 45 second delay | 1 sweep 30 second delay |
| TV Width < $W_4$ | 1 sweep 30 second delay | 1 sweep 20 second delay |
| Standard Features | 1 sweep 15 second delay | 1 sweep 10 second delay |

The preferred method of forming objects utilizing the feature detection techniques of the instant invention described herein is photopolymer based stereolithography. However, the techniques may have application in the other rapid-prototyping technologies such as powder based stereolithography and selective deposition modeling. In particular, the preferred stereolithographic systems that could be modified according to the teaching herein to implement the present invention include the SLA 250/50, the SLA 350/10 and the SLA 500/40 and their associated computer programs as manufactured and sold by 3D Systems, Inc. of Valencia, Calif. Preferred stereolithography building materials include SL 5170, SL 5180, and SL 5190 as manufactured and sold by Ciba Specialty Chemicals of Los Angeles, Calif.

The recoating styles referenced above refer to a combination of recoating techniques and recoating parameters. Examples of recoating techniques include: 1) deep dip, 2) doctor blade, 3) vacuum applicator, 4) pump applicator, 5) a reverse roller, 6) an ink jet array, 7) etc. Examples of recoating parameters include such things as: 1) sweep speed, 2) number of sweeps, 3) blade clearance, 4) blade gap, 5) dispensing flow rate, 6) dipping distance, 7) sweeping distance, 8) etc. The terms recoating style and parameters as used herein refer specifically to those recoating variables that directly impact the formation of a fresh layer of material above a previously formed lamina. As such, parameters that control whether or not a recoater sweeps over regions away from the latest laminae of the object (as taught in the '005 application, are excluded. The above noted techniques and styles are discussed in detail in a number of the patents and applications referenced above including the '931 patent and the '005 application.

The above embodiments can be preprogrammed into one or more computer systems equipped with memory and a processor and having ability to exchange data and/or communicate with each other through a suitable communication link.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of producing a three-dimensional object from a plurality of adhered laminae formed from a material capable of selective physical transformation upon exposure to prescribed stimulation, comprising:

supply data representing the object to be formed;

forming a layer of material over any previously formed adjacent lamina;

selectively exposing the layer of the material to prescribed stimulation in accordance with the data to form a next lamina of the object and to adhere said next lamina to any previously formed adjacent lamina;

repeating forming the layer and exposing the layer a plurality of times to form the three-dimensional object;

automated processing of the data to identify which laminae are identified with a desired geometric feature; and wherein forming, for at least some layers, comprises utilization of a first recoating style when the adjacent lamina includes the desired geometric feature and comprises utilization of a second recoating style when the adjacent lamina does not include the desired geometric feature.

2. The method of claim 1 wherein the selective physical transformation is the conversion of the material from a flowable state to a solid state.

3. The method of claim 2 wherein the desired geometric feature is a trapped volume.

4. The method of claim 3 wherein the desired geometric feature is a trapped volume having a linear dimension or area larger than a predetermined amount.

5. The method of claim 3 wherein the trapped volume associated with a given lamina comprises an actual trapped volume which is the result of a closed loop of solidified material completely surrounding a region of unsolidified material, which region of unsolidified material is effectively bounded from below by at least one of 1) solidified material on the adjacent lamina, or 2) a region identified as a trapped volume on the previously formed adjacent lamina.

6. The method of claim 5 wherein the effective bounding from below is determined by setting a lower limit on the minimum percentage of the region of unsolidified material which is bounded from below by a combination of one or both of 1) solidified material on the adjacent lamina, 2) a region identified as a trapped volume on the previously formed adjacent lamina.

7. The method of claim 3 wherein the trapped volume associated with a given lamina comprises an effective trapped volume which results, at least in part, from one or more horizontal breaches in a boundary wall that otherwise would surround a region of unsolidified material, which breaches are each less than a specified amount, and which region of unsolidified material is effectively bounded from below by at least one of 1) solidified material on the adjacent lamina, 2) a region identified as a trapped volume on the previously formed adjacent lamina.

8. The method of claim 3 wherein the trapped volume associated with a given lamina comprises an effective trapped volume which results, at least in part, from the given lamina being vertically located less than M laminae above a lamina containing an identified trapped volume region.

9. The method of claim 3 wherein processing data further comprises identifying horizontal extents of any trapped volumes associated with a given lamina.

10. The method of claim 1 wherein forming a layer includes the utilization of a recoating device that sweeps at or above the desired working surface and wherein the first recoating style differs from the second recoating style by at least the specification of a different sweeping speed for the recoating device.

11. The method of claim 1 wherein forming a layer includes the utilization of a material dispensing device.

12. An apparatus for producing a three-dimensional object from a plurality of adhered laminae formed from a material capable of selective physical transformation upon exposure to prescribed stimulation, comprising:

a memory to store data representing the object to be formed;

a coating device to form a layer of material over any previously formed adjacent lamina;

a source of prescribed stimulation;

a scanner to selectively direct the prescribed stimulation onto the layer of the material in accordance with the data to form a next lamina of the object and to adhere said next lamina to any previously formed adjacent lamina;

a processor to provide automated processing of the data to identify which laminae are identified with a desired geometric feature; and wherein the coating device includes at least one adjustable parameter and wherein the at least one adjustable parameter is set to a first value when the adjacent lamina includes the desired geometric feature and is set to a second value, which is different from the first value when the adjacent lamina does not include the desired geometric feature.

13. A method of producing a three-dimensional object from a plurality of adhered laminae formed from a material capable of selective physical transformation upon exposure to prescribed stimulation, comprising:

supplying data representing the object to be formed;

forming a layer of material over any previously formed adjacent lamina;

selectively exposing the layer of the material to prescribed stimulation in accordance with the data to form a next lamina of the object and to adhere said next lamina to any previously formed adjacent lamina;

repeating forming a layer and exposing the layer a plurality of times to form the three-dimensional object; and automated processing of the data to identify which laminae include a trapped volume, wherein forming, for at least some layers, comprises utilization of a first recoating style when the adjacent lamina has an associated trapped volume and comprises utilization of a second recoating style when the adjacent lamina does not include a trapped volume.

14. An apparatus for producing a three-dimensional object from a plurality of adhered laminae formed from a material capable of selective physical transformation upon exposure to prescribed stimulation, comprising:

a memory to store data representing the object to be formed;

a coating device to form a layer of material over any previously formed adjacent lamina;

a source of prescribed stimulation;

a scanner to selectively direct the prescribed stimulation onto the layer of the material in accordance with the data to form a next lamina of the object and to adhere said next lamina to any previously formed adjacent lamina;

a processor to provide automated processing of the data to identify which laminae are identified with a trapped volume feature; and wherein the coating device includes at least one adjustable parameter and wherein the at least one adjustable parameter is set to a first value when the adjacent lamina includes the trapped volume feature and is set to a second value, which is different from the first value when the adjacent lamina does not include the trapped volume feature.

15. A method of producing a three-dimensional object as claimed in claim 1, wherein the desired geometric feature includes a trapped volume and wherein the processing of the data comprises:
- deriving a potential trapped volume region associated with lamina N including unioning any up-facing regions associated with lamina N−1 and any trapped volume regions associated with lamina N−1;
- identifying the individual holes associated with lamina N;
- comparing the individual holes associated with lamina N to the potential trapped volume region associated with lamina N; and
- identifying a trapped volume as being associated with lamina N if at least one individual hole for lamina N has an overlap with the potential trapped volume region associated with lamina N which is greater than a predetermined criteria.

16. An apparatus for producing three-dimensional data as claimed in claim 12, wherein the desire geometric feature includes a trapped volume and wherein the processor is programmed to:
(a) derive a potential trapped volume region associated with lamina N including unioning any up-facing regions associated with lamina N−1 and any trapped volume regions associated with lamina N−1;
(b) identify individual holes associated with lamina N;
(c) compare the individual holes associated with lamina N to the potential trapped volume region associated with lamina N; and
(d) identify a trapped volume as being associated with lamina N if at least one individual hole for lamina N has an overlap with the potential trapped volume region associated with lamina N which is greater than a predetermined criteria.

17. An apparatus for producing three-dimensional data as claimed in claim 14, wherein the processor is programmed to:
(a) derive a potential trapped volume region associated with lamina N including unioning any up-facing regions associated with lamina N−1 and any trapped volume regions associated with lamina N−1;
(b) identify individual holes associated with lamina N;
(c) compare the individual holes associated with lamina N to the potential trapped volume region associated with lamina N; and
(d) identify a trapped volume as being associated with lamina N if at least one individual hole for lamina N has an overlap with the potential trapped volume region associated with lamina N which is greater than a predetermined criteria.

18. A method for forming a three-dimensional object as claimed in claim 13, wherein the processing of the data comprises:
- deriving a potential trapped volume region associated with lamina N including unioning any up-facing regions associated with lamina N−1 and any trapped volume regions associated with lamina N−1;
- identifying individual holes associated with lamina N;
- comparing the individual holes associated with lamina N to the potential trapped volume region associated with lamina N; and
- identifying a trapped volume as being associated with lamina N if at least one individual hole for lamina N has an overlap with the potential trapped volume region associated with lamina N which is greater than a predetermined criteria.

19. A method of producing a three-dimensional object from a plurality of adhered laminae formed from a material capable of selective physical transformation upon exposure to prescribed stimulation, comprising:
- supplying data representing the object to be formed;
- forming a layer of material over any previously formed adjacent lamina;
- selectively exposing the layer of the material to prescribed stimulation in accordance with the data to form a next lamina of the object and to adhere said next lamina to any previously formed adjacent lamina;
- repeating forming the layer and exposing the layer a plurality of times to form the three-dimensional object; and
- processing the data to identify which laminae are identified with a desired geometric feature comprising a trapped volume region;
- wherein forming, for at least some layers, comprises utilization of a first recoating style when the adjacent lamina includes the desired geometric feature and comprises utilization of a second recoating style when the adjacent lamina does not include the desired geometric feature; and
- wherein the processing of the data comprises:
  - deriving the potential trapped volume region associated with lamina N including unioning any up-facing regions associated with lamina N−1 and any trapped volume regions associated with lamina N−1;
  - identifying individual holes associated with lamina N;
  - comparing the individual holes associated with lamina N to the potential trapped volume region associated with lamina N; and
  - identifying a trapped volume as being associated with lamina N if at least one individual hole for lamina N has an overlap with the potential trapped volume region associated with lamina N which is greater than a predetermined criteria.

20. An apparatus for producing a three-dimensional object from a plurality of adhered laminae formed from a material capable of selective physical transformation upon exposure to prescribed stimulation, comprising:
- a memory for storing data representing the object to be formed;
- a coating device for forming a layer of material over any previously formed adjacent lamina;
- a source of prescribed stimulation;
- a scanner for selectively directing the prescribed stimulation onto the layer of the material in accordance with the data to form a next lamina of the object and to adhere said next lamina to any previously formed adjacent lamina;
- a processor for processing the data to identify which laminae are identified with a desired geometric feature comprising a trapped volume region; and
- wherein the coating device includes at least one adjustable parameter and wherein the at least one adjustable parameter is set to a first value when the adjacent lamina includes the desired geometric feature and is set to a second value, which is different from the first value when the adjacent lamina does not include the desired geometric feature;
- wherein the processor is programmed to:
  (1) derive the potential trapped volume region associated with lamina N including unioning any up-facing regions associated with lamina N−1 and any trapped volume regions associated with lamina N−1;

(2) identify individual holes associated with lamina N;

(3) compare the individual holes associated with lamina N to the potential trapped volume region associated with lamina N; and (4) identify a trapped volume as being associated with lamina N if at least one individual hole for lamina N has an overlap with the potential trapped volume region associated with lamina N which is greater than a predetermined criteria.

21. An apparatus for producing a three-dimensional object from a plurality of adhered laminae formed from a material capable of selective physical transformation upon exposure to prescribed stimulation, comprising:

means for storing data representing the object to be formed;

means for forming a layer of material over any previously formed adjacent lamina;

means for supplying prescribed stimulation;

means for selectively directing the prescribed stimulation onto the layer of the material in accordance with the data to form a next lamina of the object and to adhere said next lamina to any previously formed adjacent lamina;

means for providing automated processing of the data to identify which laminae are identified with a desired geometric feature; and wherein the means for forming includes at least one adjustable parameter and wherein the at least one adjustable parameter is set to a first value when the adjacent lamina includes the desired geometric feature and is set to a second value, which is different from the first value when the adjacent lamina does not include the desired geometric feature.

22. An apparatus for producing a three-dimensional object from a plurality of adjered laminae formed from a material capable of selective physical transformation upon exposure to prescribed stimulation, comprising:

means for storing data representing the object to be formed;

means for forming a layer of material over any previously formed adjacent lamina, means for supplying prescribed stimulation;

means for selectively directing the prescribed stimulation onto the layer of the material in accordance with the data to form a next lamina of the object and to adhere said next lamina to any previously formed adjacent lamina;

means for providing automated processing of the data to identify which laminae are identified with a trapped volume feature; and wherein the means for forming includes at least one adjustable parameter and wherein the at least one adjustable parameter is set to a first value when the adjacent lamina includes the trapped volume feature and is set to a second value, which is different from the first value when the adjacent lamina does not include the trapped volume feature.

23. The method of claim 1, wherein the processing of the data is performed by a computer.

24. The method of claim 1, wherein the processing of the data includes utilization of comparison operators between at least two laminae.

25. The method of claim 1, wherein the processing of the data includes the utilization of Boolean comparison operators between at least two laminae.

26. The method of claim 1, wherein the forming, for at least some layers, comprises utilization of an automatic specification of coating parameters.

27. The apparatus of claim 12, wherein the processor includes a computer.

28. The apparatus of claim 12, wherein the processor is programmed to automatically specify coating parameters.

29. The method of claim 13, wherein the processing of the data is performed by a computer.

30. The method of claim 13 wherein the processing of the data includes utilization of comparison operators between at least two laminae.

31. The method of claim 13, wherein the processing of the data includes the utilization of Boolean comparison operators between at least two laminae.

32. The method of claim 13, wherein the forming, for at least some layers, comprises utilization of an automatic specification of coating parameters.

33. The apparatus of claim 14, wherein the processor includes a computer.

34. The apparatus of claim 14, wherein the processor is programmed to automatically specify coating parameters.

* * * * *